US011941977B2

(12) United States Patent
Pomatto

(10) Patent No.: US 11,941,977 B2
(45) **Date of Patent: *Mar. 26, 2024**

(54) NETWORK-BASED VEHICLE TRAFFIC SIGNAL CONTROL SYSTEM

(71) Applicant: SYSTEMS ANALYSIS & INTEGRATION, INC., Orange, CA (US)

(72) Inventor: Lawrence Anthony Pomatto, Santa Ana, CA (US)

(73) Assignee: Systems Analysis & Integration, Inc., Orange, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/843,767

(22) Filed: Jun. 17, 2022

(65) Prior Publication Data

US 2023/0141273 A1 May 11, 2023

Related U.S. Application Data

(63) Continuation of application No. 17/105,292, filed on Nov. 25, 2020, now Pat. No. 11,367,350, which is a (Continued)

(51) Int. Cl.

*G08G 1/07* (2006.01)
*G08G 1/005* (2006.01)

(Continued)

(52) U.S. Cl.

CPC ............... *G08G 1/07* (2013.01); *G08G 1/005* (2013.01); *G08G 1/0116* (2013.01); *G08G 1/095* (2013.01); *G08G 1/097* (2013.01)

(58) Field of Classification Search

CPC ........ G08G 1/07; G08G 1/0116; G08G 1/095; G08G 1/097; G08G 1/005; G08G 1/08

See application file for complete search history.

(56) References Cited

U.S. PATENT DOCUMENTS 3,920,967 A 11/1975 Martin et al.
4,135,145 A 1/1979 Eberle (Continued)

FOREIGN PATENT DOCUMENTS

CN 107170249 A 9/2017
GB 2542649 A 3/2017

(Continued)

*Primary Examiner* — John A Tweel, Jr.

(74) *Attorney, Agent, or Firm* — Knobbe, Martens, Olson & Bear LLP

(57) ABSTRACT

A feature-rich, improved vehicle traffic signal control system that uses network technology is provided herein. For example, the improved vehicle traffic signal control system may include a control box and light heads that include processors. The control box in the improved vehicle traffic signal control system may include fewer components and/or fewer wires extending therefrom as compared to a typical control box. In particular, the control box in the improved vehicle traffic signal control system may not include relays, a conflict monitor, or other similar components. Rather, the improved control box may simply include a controller that is coupled to various light heads via Ethernet cables. The Ethernet cables can carry electrical power, thereby providing power to the light heads. The light head processors can use network technology to control light activation, to perform conflict monitoring, to receive data from various sensors to adjust traffic flow, etc.

20 Claims, 12 Drawing Sheets

Related U.S. Application Data continuation of application No. 16/685,929, filed on Nov. 15, 2019, now Pat. No. 10,854,074, which is a continuation of application No. 15/976,402, filed on May 10, 2018, now Pat. No. 10,482,763.

(51) Int. Cl.

| | |
|---|---|
| ***G08G 1/01*** | (2006.01) |
| ***G08G 1/095*** | (2006.01) |
| ***G08G 1/097*** | (2006.01) |

(56) References Cited

U.S. PATENT DOCUMENTS

| | | | | |
|---|---|---|---|---|
| 8,373,578 | B1 | 2/2013 | Sikora et al. | |
| 8,386,661 | B2 * | 2/2013 | Ostrovsky | H04L 12/2814 700/12 |
| 8,547,249 | B2 | 10/2013 | David et al. | |
| 8,797,184 | B2 | 8/2014 | Tate et al. | |
| 8,819,313 | B1 | 8/2014 | Walther et al. | |
| 9,087,451 | B1 * | 7/2015 | Jarrell | G08G 5/003 |
| 10,002,536 | B2 * | 6/2018 | Kim | B60W 30/09 |
| 10,008,113 | B2 | 6/2018 | Ova et al. | |
| 10,192,436 | B2 * | 1/2019 | Bauer | G08G 1/0116 |
| 10,210,753 | B2 * | 2/2019 | Russell | G08G 1/0141 |
| 10,482,763 | B1 | 11/2019 | Pomatto | |
| 10,854,074 | B2 | 12/2020 | Pomatto | |
| 11,367,350 | B2 * | 6/2022 | Pomatto | G08G 1/095 |
| 2009/0322563 | A1 | 12/2009 | Stadtmiller et al. | |
| 2016/0148507 | A1 | 5/2016 | Pittman et al. | |

FOREIGN PATENT DOCUMENTS

| | | | |
|---|---|---|---|
| KR | 20050117819 | A | 12/2005 |
| KR | 101196758 | B1 | 10/2012 |

* cited by examiner

NETWORK-BASED VEHICLE TRAFFIC SIGNAL CONTROL SYSTEM

CROSS-REFERENCE TO RELATED APPLICATIONS

This application is a continuation of U.S. patent application Ser. No. 17/105,292, entitled "NETWORK-BASED VEHICLE TRAFFIC SIGNAL CONTROL SYSTEM" and filed on Nov. 25, 2020, soon to issue as U.S. Pat. No. 11,367,350, which is a continuation of U.S. patent application Ser. No. 16/685,929, entitled "NETWORK-BASED VEHICLE TRAFFIC SIGNAL CONTROL SYSTEM" and filed on Nov. 15, 2019, issued as U.S. Pat. No. 10,854,074, which is a continuation of U.S. patent application Ser. No. 15/976,402, entitled "NETWORK-BASED VEHICLE TRAFFIC SIGNAL CONTROL SYSTEM" and filed on May 10, 2018, issued as U.S. Pat. No. 10,482,763, which are hereby incorporated by reference herein in their entireties. Any and all applications for which a foreign or domestic priority claim is identified in the Application Data Sheet as filed with the present application are hereby incorporated by reference under 37 CFR 1.57.

BACKGROUND

Light heads at a street intersection generally each include various lights, such as one or more red lights, one or more yellow lights, one or more green lights, one or more turn signal lights, etc. A typical vehicle traffic signal control system includes a control box located near an intersection at which one or more light heads are located. The control box typically includes components for controlling which lights of the light head(s) are enabled and which lights of the light head(s) are disabled. For example, the control box may include a controller, a power distribution module, relays, and a conflict monitor.

SUMMARY

The systems and methods described herein each have several aspects, no single one of which is solely responsible for its desirable attributes. Without limiting the scope of this disclosure, several non-limiting features will now be discussed briefly.

One aspect of the disclosure provides a system comprising a traffic control box comprising a controller; and a first light head. The first light head comprises a processor, a first red light, and a first green light, where the first light head is coupled to the controller via a wired connection and is configured to receive electrical power from the controller, and where the processor is configured with computer-executable instructions that, when executed, cause the processor to at least: process a light head control message received from the controller; process a first status message received from a second light head via the controller, where the first status message indicates that a second green light is off; process a second status message received from the second light head via the controller, where the second status message indicates that a second red light is on; in response to reception of the second status message, determine that the first green light can be activated based on the light head control message; cause the electrical power received from the controller to pass through to the first green light to cause illumination of the first green light; generate a third status message indicating that the first green light is on; and transmit the third status message to the second light head via the controller.

The system of the preceding paragraph can include any sub-combination of the following features: where the system further comprises a crosswalk button coupled to the controller, where the crosswalk button, when activated, causes a crosswalk sign to signal that pedestrians can cross an intersection in a first direction, and where the first light head faces a second direction that is perpendicular to the first direction; where the computer-executable instructions, when executed, further cause the processor to at least: process a fourth status message received from the crosswalk button via the controller, where the fourth status message indicates that the crosswalk sign is disabled, and in response to reception of the second and fourth status messages, determine that the first green light can be activated based on the light head control message; where the system further comprises a crosswalk button coupled to the controller, where the crosswalk button, when activated, causes a crosswalk sign to signal that pedestrians can cross an intersection in a first direction, and where the first light head faces the first direction; where the light head control message comprises an indication that the first green light is deactivated a threshold period of time after being activated, and where the computer-executable instructions, when executed, further cause the processor to at least: process a fourth status message received from the crosswalk button via the controller, where the fourth status message indicates that the crosswalk sign is enabled, determine that the threshold period of time has expired, determine that no status message indicating that the crosswalk sign is disabled has been received from the crosswalk button after reception of the fourth status message, and determine not to deactivate the first green light; where the computer-executable instructions, when executed, further cause the processor to at least: process a fifth status message received from the crosswalk button via the controller, where the fifth status message indicates that the crosswalk sign is disabled, and cause the electrical power received from the controller to no longer pass through to the first green light to deactivate the first green light; where the light head control message comprises one or more rules defining a condition under which the first light head can activate the first green light; where the first light head is coupled to the controller via an Ethernet cable; where the first light head is configured to receive the electrical power from the controller via the Ethernet cable; and where the system further comprises a vehicle sensor coupled to the controller, where the vehicle sensor is configured to receive the electrical power from the controller via an Ethernet cable.

Another aspect of the disclosure provides a computer-implemented method comprising, as implemented by a first light head having one or more processors and a first green light, receiving a light head control message; receiving a first status message from a second light head, where the first status message indicates that a second green light is off; receiving a second status message from the second light head, where the second status message indicates that a red light is on; in response to reception of the second status message, determining that the first green light can be activated based on the light head control message; causing electrical power to pass through to the first green light to activate the first green light; generating a third status message indicating that the first green light is on; and transmitting the third status message to the second light head.

The computer-implemented method of the preceding paragraph can include any sub-combination of the following features: where determining that the first green light can be activated based on the light head control message further comprises: receiving a fourth status message from a crosswalk button, where the crosswalk button, when activated, causes a crosswalk sign to signal that pedestrians can cross an intersection in a first direction, where the first light head faces a second direction that is perpendicular to the first direction, and where the fourth status message indicates that the crosswalk sign is disabled, and in response to reception of the second and fourth status messages, determining that the first green light can be activated based on the light head control message; where the light head control message comprises an indication that the first green light is deactivated a threshold period of time after being activated, and where the computer-implemented method further comprises: receiving a fourth status message from a crosswalk button, where the crosswalk button, when activated, causes a crosswalk sign to signal that pedestrians can cross an intersection in a first direction, where the first light head faces the first direction, and where the fourth status message indicates that the crosswalk sign is enabled, determining that the threshold period of time has expired, determining that no status message indicating that the crosswalk sign is disabled has been received from the crosswalk button after reception of the fourth status message, and determining not to deactivate the first green light; where the computer-implemented method further comprises: receiving a fifth status message from the crosswalk button, where the fifth status message indicates that the crosswalk sign is disabled, and causing the electrical power to no longer pass through to the first green light to deactivate the first green light; and where receiving a light head control message further comprises receiving the light head control message from one of a controller or a third light head.

Another aspect of the disclosure provides non-transitory, computer-readable storage media comprising computer-executable instructions, where the computer-executable instructions, when executed by a first light head comprising a processor and a first green light, cause the first light head to perform operations comprising: processing a first status message received from a second light head, where the first status message indicates that a second green light is off; processing a second status message received from the second light head, where the second status message indicates that a red light is on; in response to reception of the second status message, determining that the first green light can be activated; causing electrical power received by the first light head to pass through to the first green light to activate the first green light; generating a third status message indicating that the first green light is on; and transmitting the third status message to the second light head.

The non-transitory, computer-readable storage media of the preceding paragraph can include any sub-combination of the following features: where the first light head further performs operations comprising: processing a fourth status message received from a crosswalk button, where the crosswalk button, when activated, causes a crosswalk sign to signal that pedestrians can cross an intersection in a first direction, where the first light head faces a second direction that is perpendicular to the first direction, and where the fourth status message indicates that the crosswalk sign is disabled, and in response to reception of the second and fourth status messages, determining that the first green light can be activated; where the first light head is configured to deactivate the first green light a threshold period of time after activating the first light head, and where the first light head further performs operations comprising: processing a fourth status message received from a crosswalk button, where the crosswalk button, when activated, causes a crosswalk sign to signal that pedestrians can cross an intersection in a first direction, where the first light head faces the first direction, and where the fourth status message indicates that the crosswalk sign is enabled, determining that the threshold period of time has expired, determining that no status message indicating that the crosswalk sign is disabled has been received from the crosswalk button after reception of the fourth status message, and determining not to deactivate the first green light; where the first light head further performs operations comprising: processing a fifth status message received from the crosswalk button, where the fifth status message indicates that the crosswalk sign is disabled, and causing the electrical power to no longer pass through to the first green light to deactivate the first green light; and where the first light head receives the electrical power from a solar panel coupled to a pole to which the first light head is coupled.

Another aspect of the disclosure provides a system comprising: a traffic control box located at a street intersection, where the traffic control box comprises a controller; a first light head comprising a processor, a red light, a yellow light, and a green light; a pole extending upward from a street that forms a portion of the street intersection, the pole configured to support the first lead head above the street intersection, where the pole comprises a conduit that extends from the traffic control box to the first light head; and a single cable coupled to the controller and the processor, where the single cable passes through the conduit in the pole to couple to the controller and the processor, and where the single cable is configured to carry electrical power from the controller to the processor and to transmit data between the controller and the processor.

The system of the preceding paragraph can include any sub-combination of the following features: where the processor is configured to route the electrical power received via the single cable to one of the red light, the yellow light, or the green light to cause the respective light to illuminate; where the data comprises a light head control message, the light head control message comprising instructions used by the processor to determine when to enable or disable at least one of the red light, the yellow light, or the green light; where the traffic control box further comprises a power distribution module, where the power distribution module is configured to: convert alternating current (AC) electrical power into direct current (DC) power, and route the DC power to the controller; and where the single cable is a single Ethernet cable.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF SPECIFIC EMBODIMENTS

Figure 1A:
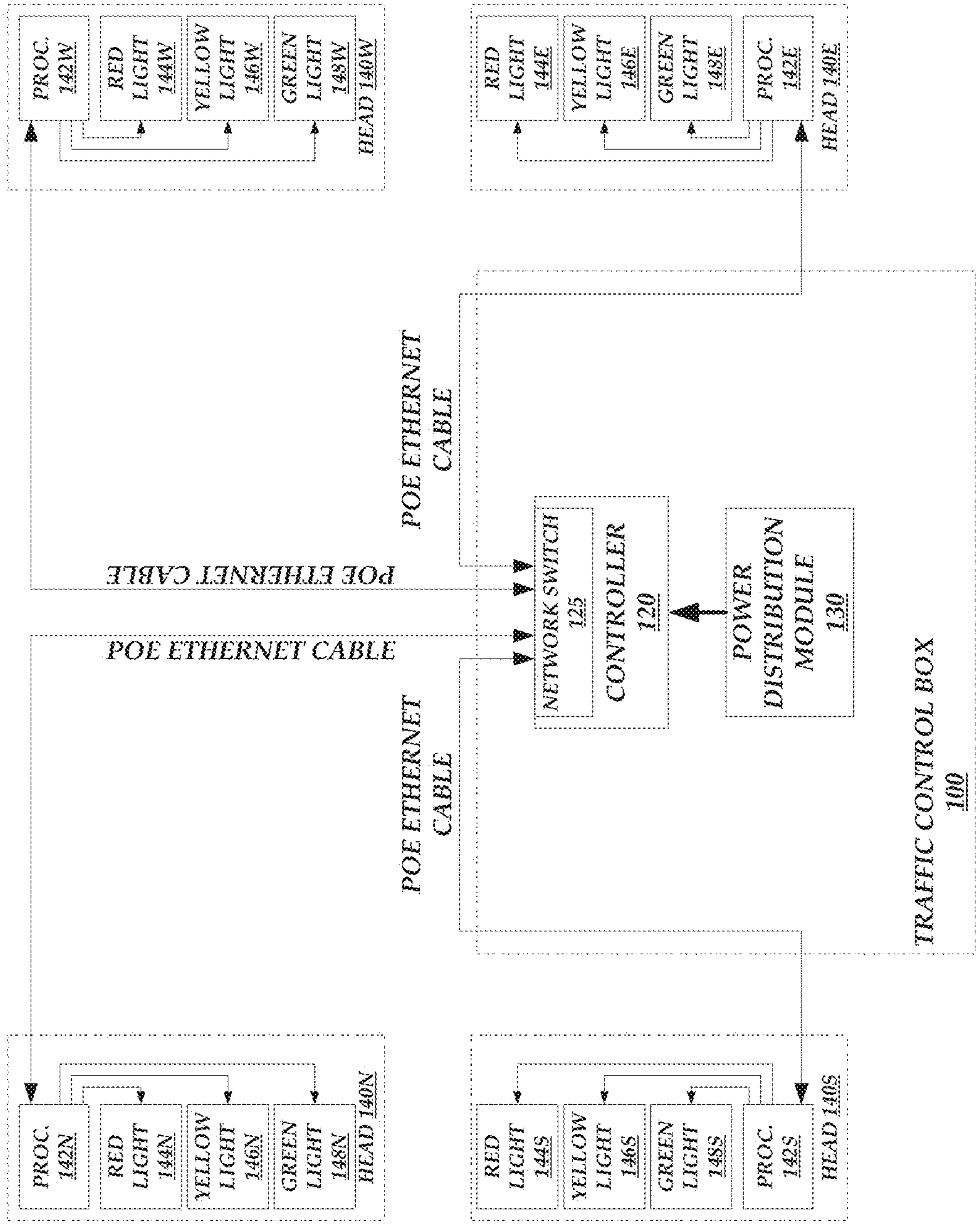
FIG. 1A illustrates an exemplary block diagram depicting an improved vehicle traffic signal control system, which includes traffic control box and various light heads.

Introduction to an Improved Vehicle Traffic Signal Control System

As described above, a control box in a typical vehicle traffic signal control system may include a controller, a power distribution module, output relays, digital inputs, and a conflict monitor. The output relays may be used to control each light in a light head, each crosswalk indicator, and/or other auxiliary equipment (e.g., railroad crossing indicators, etc.). For example, one relay may be used to turn on a light in a light head. Thus, the control box can include N relays, where N represents the sum of the total number of lights in the light head(s) at the intersection, the total number of crosswalk indicators at the intersection, and/or the total number of auxiliary equipment outputs. When enabled, a relay may deliver 120 VAC or other voltage to the connected light or crosswalk indicator, thereby turning on the light or crosswalk indicator. The controller in the typical control box may determine and control which relays are enabled and which are disabled. For example, the controller may be connected to each relay and send a low power signal to a relay that should be enabled. The controller can vary the duration of time that a relay is enabled based on whether a pedestrian presses a crosswalk button (e.g., relays controlling lights parallel to the direction in which a pedestrian would like to cross may remain enabled longer when a pedestrian presses a crosswalk button), the time of day, etc. The controller can also rapidly enable and disable relays, such as to cause the red lights to flash at an intersection, a crosswalk indicator to flash to indicate that the time to cross is ending, and/or the like.

The conflict monitor in the typical control box may monitor the low power signals sent by the controller to the relays and/or the outputs from the relays. If there is a conflict (e.g., an output is sent to the relay controlling a green light facing North at the same time that an output is sent to the relay controlling a green light facing West such that perpendicular green lights are both enabled), the conflict monitor can override the controller and cause all the red lights at the intersection to flash, disabling the intersection until the intersection is serviced in some embodiments.

In total, there may be a certain number of wires that connect each light head to the typical control box, where the number depends on the number of lights in the respective light head. As an illustrative example, if a light head includes three lights (e.g., red, yellow, and green), then there may be five wires that connect the light head to the typical control box: a 120 VAC power line to the red light, a 120 VAC power line to the yellow light, a 120 VAC power line to the green light, neutral, and ground. In another illustrative example, the power lines to each light may be 48 VDC. Because of the high voltage delivered to each light in a light head, the wires can have a wide diameter (e.g., a diameter greater than 2.06 mm). In this example, if the intersection includes three other light heads with three lights each, this means that there may be 20 bulky wires (e.g., 20 wires that each have wide diameters) extending from the typical control box to the various light heads (e.g., five bulky wires extending to each light head, where the diameter of a bundled set of the five bulky wires may be 10 mm, 20 mm, etc.). The number of bulky wires increases as the number of lights and/or light heads present at an intersection increases.

Furthermore, bulky wires may be routed from the typical control box to underground coils (e.g., for sensing vehicles), to crosswalk buttons (e.g., to detect when a pedestrian would like to cross an intersection), and/or to other sensors that may be present at the intersection. Thus, additional bulky wires extending from the typical control box may be present to accommodate other sensors that are used to control the flow of traffic.

The size of all these wires can increase construction costs by requiring larger underground and/or above-ground conduits to route the wires. In some cases, space near an intersection may be limited due to the presence of other structures or other conduits near an intersection (e.g., buildings, overpasses, bridges, tunnels, gas lines, water mains, etc.). Given the space constraints, the number of lights and/or light heads that can be added to an existing intersection or placed at a new intersection may be limited, and a planner may be forced to make design choices that prevent the use of newer technologies (e.g., cameras, light emitting diode (LED) lights, Internet-of-Things (IoT) devices, etc.) at the intersection that could improve traffic flow. Even if space near an intersection is not limited, the cost of adding new conduits to route wires for new lights or technologies can be prohibitive. For example, construction crews may have to tear up an existing intersection to add new conduits. Such actions can significantly increase construction costs and negatively impact traffic (e.g., cause congestion or other delays for motorists and/or pedestrians), possibly restricting the ability to quickly roll out new technology or otherwise upgrade existing intersections.

Accordingly, a low-cost, feature-rich improved vehicle traffic signal control system that uses Ethernet and/or wireless technologies is described herein. For example, like the typical vehicle traffic signal control system, the improved vehicle traffic signal control system may include a control box. However, the control box in the improved vehicle traffic signal control system may include fewer components and/or fewer wires extending therefrom as compared to the typical control box. In particular, the control box in the improved vehicle traffic signal control system may not include relays, a conflict monitor, or other similar components. Rather, the improved control box may simply include a controller that is coupled to various light heads via Ethernet cables. The Ethernet cables can carry electrical power, thereby providing power to the light heads. The light heads can include processors that use network technology to control light activation, to perform conflict monitoring, to receive data from various sensors to adjust traffic flow, and/or the like. Additional details of the improved vehicle traffic signal control system are described herein with respect to FIGS. 1A-1B and 3A through 8.

FIG. 1A illustrates an exemplary block diagram depicting an improved vehicle traffic signal control system, which includes traffic control box 100 and various light heads 140N, 140S, 140W, and/or 140E. The traffic control box 100 and the light heads 140N, 140S, 140W, and/or 140E may be associated with a single intersection. For example, the traffic control box 100 may be an enclosure located underneath an intersection, adjacent to an intersection (e.g., above ground, such as next to a sidewalk at the intersection, or below ground, such as below a sidewalk at the intersection or below undeveloped land or a structure within a certain distance of the intersection), or remote from the intersection (e.g., located a threshold distance from the intersection, such as 1 or 2 blocks from the intersection (e.g., when one controller is used to control offset intersections), etc.). The light heads 140N, 140S, 140W, and/or 140E may be located on poles, cables, or other structures that may optionally extend upward from the street (or from a location adjacent to the street, such as a sidewalk) and that can support the light heads 140N, 140S, 140W, and/or 140E above the intersection or the streets that form the intersection.

Figure 1B:
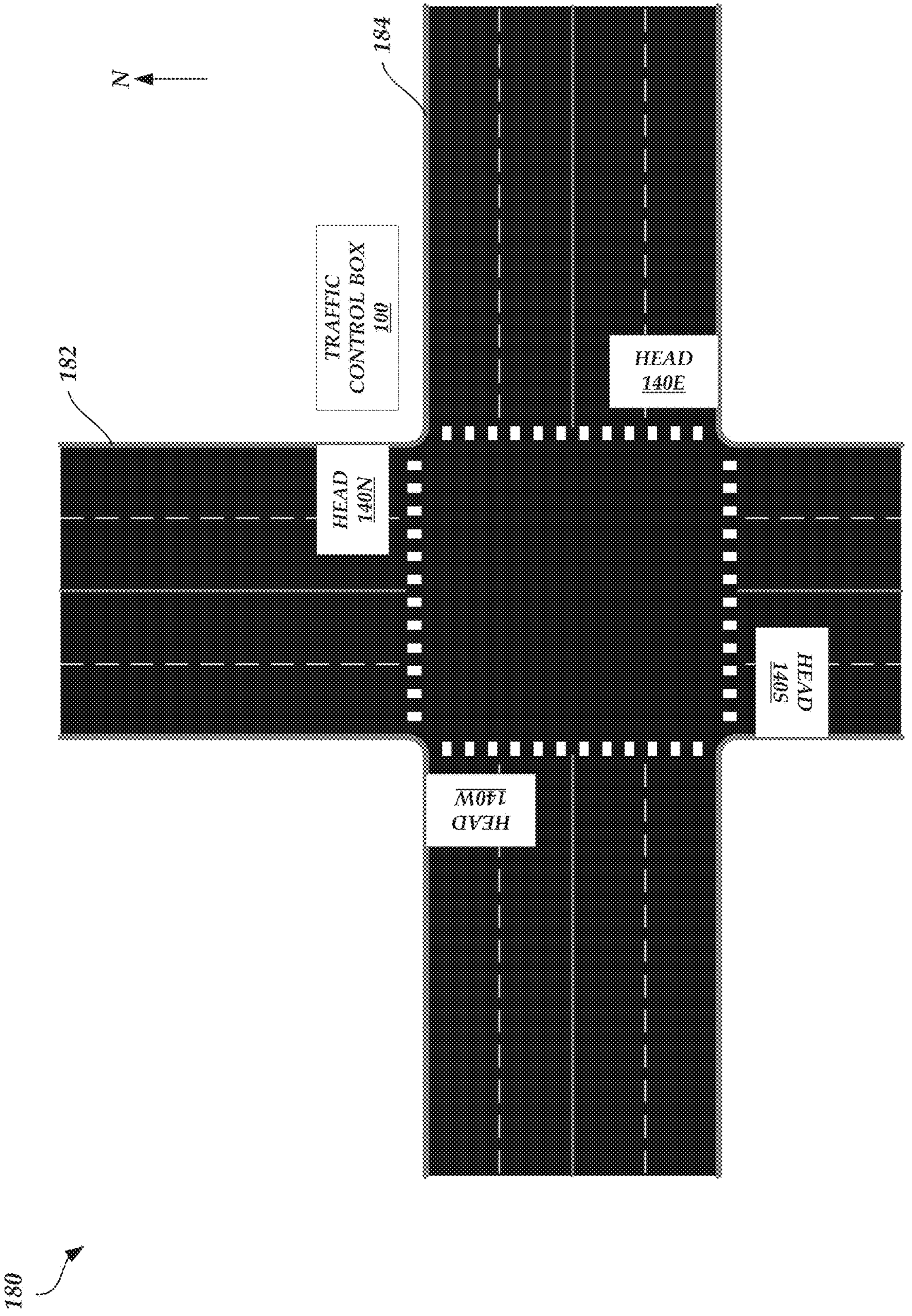
FIG. 1B illustrates an exemplary location of the traffic control box and the light heads of FIG. 1A at an intersection.

As an example, FIG. 1B illustrates an exemplary location of the traffic control box 100 and the light heads 140N, 140S, 140W, and/or 140E at an intersection 180. For example, the light head 140N may be positioned above street 182 and face vehicles heading North, the light head 140S may be positioned above the street 182 and face vehicles heading South, the light head 140W may be positioned above street 184 and face vehicles heading West, and the light head 140E may be positioned above the street 184 and face vehicles heading East. The traffic control box 100 may be located adjacent to streets 182 and 184 (e.g., above and/or below ground), near the Northeast corner of the intersection 180.

While FIGS. 1A-1B depict four light heads 140N, 140S, 140W, and/or 140E, this is for illustrative purposes only and is not meant to be limiting. For example, the improved vehicle traffic signal control system can include any number of light heads facing any number of directions. As an illustrative example, two light heads could be positioned above the street 182 and face vehicles heading North, where the first light head includes lights for vehicles that intend to continue North on the street 182 through the intersection, and where the second light head includes turn signal lights for vehicles that intend to turn West onto the street 184 from the street 182. Similarly, two (or more) light heads could be positioned above the street 182 and face vehicles heading South, two (or more) light heads could be positioned above the street 184 and face vehicles heading West, and/or two (or more) light heads could be positioned above the street 184 and face vehicles heading East.

Furthermore, while FIG. 1B depicts an intersection of two streets 182 and 184, this is for illustrative purposes only and is not meant to be limiting. The features of the improved vehicle traffic signal control system disclosed herein can apply to any number of intersecting streets.

As illustrated in FIG. 1A, each light head 140N, 140S, 140W, 140E includes a processor 142N, 142S, 142W, or 142E, a red light 144N, 144S, 144W, or 144E, a yellow light 146N, 146S, 146W, or 146E, and a green light 148N, 148S, 148W, or 148E. The number of lights in each light head 140N, 140S, 140W, 140E is not meant to be limiting, however. In general, each light head 140N, 140S, 140W, 140E may include one or more processors 142N, 142S, 142W, and/or 142E. However, each light head 140N, 140S, 140W, 140E can include any number of lights and/or a different number of lights. For example, the light head 140N could include two red lights (e.g., one red light for through traffic and one red light for left turn traffic) and two green lights (e.g., one green light for through traffic and one green light for left turn traffic), but the light head 140W could include one red light (e.g., one red light for both through and left turn traffic) and two green lights (e.g., one green light for through traffic and one green light for left turn traffic).

The traffic control box 100 includes a controller 120 and a power distribution module 130. The controller 120 may include one or more processors, memory, a network interface (e.g., network switch 125), and/or other hardware components. The one or more processors of the controller 120 can be configured to execute computer-executable instructions stored in the memory that, when executed, cause the controller 120 to perform the operations described herein. For example, the controller 120 can be configured to generate one or more light head control messages. A light head control message may include a set of rules or instructions that define how long a red light, yellow light, and/or green light should be enabled (e.g., activated, turned on, etc.), what conditions should be satisfied in order to enable a red light, a yellow light, and/or a green light, and/or what conditions should be satisfied in order to disable (e.g., deactivate, turn off, etc.) a red light, a yellow light, and/or a green light. Additional details of the light head control message are provided below.

The controller 120 can include a network switch 125 used to transmit the light head control message to one or more of the processors 142N, 142S, 142W, and/or 142E of the light head(s) 140N, 140S, 140W, and/or 140E. For example, each processor 142N, 142S, 142W, 142E may be coupled to the network switch 125 via the same cable (e.g., an Ethernet cable) or via one or more different cables (e.g., processors 142N and 142S can be coupled to the network switch 125 via a first Ethernet cable and processors 142W and 142E can be coupled to the network switch 125 via a second Ethernet cable, processors 142N, 142S, 142W, and/or 142E can each be coupled to the network switch 125 via a different Ethernet cable, etc.). For simplicity, FIG. 1A depicts each processor 142N, 142S, 142W, and/or 142E being coupled to the network switch 125 via a different Ethernet cable. The Ethernet cable(s) can be designed with additional shielding and/or other features that enable the cable(s) to last for an extended period of time (e.g., 30 years, 40 years, 50 years, etc.).

Furthermore, the light heads 140N, 140S, 140W, and/or 140E can communicate with each other via the network switch 125. For example, the light heads 140N, 140S, 140W, and/or 140E can communicate with each other to identify the status of other light heads 140N, 140S, 140W, and/or 140E, to determine when to enable or disable lights 144N, 144S, 144W, 144E, 146N, 146S, 146W, 146E, 148N, 148S, 148W, and/or 148E (e.g., using the rules or instructions included in a received light head control message as a guide), and/or to perform conflict monitoring. Additional details of the communications between light heads 140N, 140S, 140W, and/or 140E are provided below.

Alternatively or in addition, not shown, the processors 142N, 142S, 142W, and/or 142E and/or the controller 120 can communicate with each other wirelessly. For example, the controller 120 can include a wireless router or transmitter that is configured to transmit light head control messages to one or more of the processors 142N, 142S, 142W, and/or 142E (or to a network interface included in the light heads 140N, 140S, 140W, and/or 140E) via a wireless network (e.g., BLUETOOTH, WIFI, a cellular network, etc.). Other components described herein (e.g., sensors, camera, IoT devices, crosswalk buttons, etc.) can also communicate with the controller 120 and/or light heads 140N, 140S, 140W, and/or 140E wirelessly.

In addition, the controller 120 may be configured to route electrical power to one or more of the light heads 140N, 140S, 140W, and/or 140E. For example, the power distribution module 130 may be coupled to a mains electricity system (e.g., a system that provides alternating-current (AC) electrical power). The power distribution module 130 can route the electrical power to the controller 120. The electrical power may be 120V with a frequency of 60 Hz, 230V with a frequency of 50 Hz, 230V with a frequency of 60 Hz, and/or similar voltage and frequency combinations. In some embodiments, the power distribution module 130 converts the AC electrical power into direct current (DC) electrical power and routes the DC electrical power to the controller 120. In other embodiments, the power distribution 130 routes the AC electrical power to the controller 120.

The controller 120, via the network switch 125, can then route the electrical power to the various light heads 140N, 140S, 140W, and/or 140E via the Ethernet cable(s). In particular, the controller 120 can use Power over Ethernet (PoE) technology to pass both electrical power and data (e.g., light head control messages) over the wires that comprise an Ethernet cable. The Ethernet cable(s) can be coupled to the controller 120 on one end, and pass through one or more conduits present in poles or other structures that support one or more of the light heads 140N, 140S, 140W, and/or 140E to couple to one or more of the light heads 140N, 140S, 140W, and/or 140E on the other end (e.g., the conduit(s) may extend from the traffic control box 100 to one or more light heads 140N, 140S, 140W, and/or 140E). As an illustrative example, the controller 120 can transmit electrical power and data over the same wires that comprise an Ethernet cable. As another illustrative example, the controller 120 can transmit electrical power over a first set of wires that partially comprises an Ethernet cable and can transmit data over a second set of wires that partially comprises the same Ethernet cable. In some embodiments, a first set of wires (e.g., a first pair of wires) that partially comprises an Ethernet cable carry positive electrical power (e.g., DC+) and a second set of wires (e.g., a second pair of wires) that partially comprises an Ethernet cable carry negative electrical power (e.g., DC−).

The light heads 140N, 140S, 140W, and/or 140E can use the electrical power provided over the Ethernet cables to enable the red lights 144N, 144S, 144W, and/or 144E, the yellow lights 146N, 146S, 146W, and/or 146E, and/or the green lights 148N, 148S, 148W, and/or 148E. For example, the processor 142N can determine whether the red light 144N, the yellow light 146N, or the green light 148N should be enabled. Once the determination is made, the processor 142N (or a power distribution component in the light head 140N, not shown) can route the received electrical power to the light 144N, 146N, or 148N that is to be enabled. As an illustrative example, the processor 142N can cause a switch or relay to close, thereby closing a circuit loop, which causes current to pass through the light 144N, 146N, or 148N that is to be enabled. The closed circuit loop can include the light 144N, 146N, or 148N that is to be enabled, where closure of the switch or relay causes the light 144N, 146N, or 148N to be coupled to both the first set of wires in the Ethernet cable that carry positive electrical power and the second set of wires in the Ethernet cable that carry negative electrical power. The current passing through the light 144N, 146N, and/or 148N causes the light 144N, 146N, and/or 148N to illuminate or produce light. The light 144N, 146N, and/or 148N remains on until electrical power is no longer supplied to the light 144N, 146N, and/or 148N (e.g., until the processor 142N stops supplying electrical power to the light 144N, 146N, and/or 148N by, for example, causing a switch or relay to open).

In some embodiments, the red lights 144N, 144S, 144W, and/or 144E, the yellow lights 146N, 146S, 146W, and/or 146E, and/or the green lights 148N, 148S, 148W, and/or 148E each include a light bulb (e.g., a 120V light bulb, a 130V light bulb, a 230V light bulb, etc.) and a colored covering housing the light bulb that produces the red, yellow, or green color. Such light bulbs may each consume a large amount of power (e.g., more than 100 W). Earlier versions of the PoE standard (e.g., IEEE 802.3af-2003 and IEEE 802.3at-2009) limited the amount of electrical power that could be supplied via the Ethernet cable to less than 25.5 W. If an earlier PoE standard is implemented and the light head 140N, 140S, 140W, and/or 140E to which electrical power is being supplied includes light bulbs, then multiple PoE Ethernet cables can be coupled between the controller 120 and the light head 140N, 140S, 140W, and/or 140E such that enough electrical power is provided to the light head 140N, 140S, 140W, and/or 140E to enable the lights 144N, 144S, 144W, 144E, 146N, 146S, 146W, 146E, 148N, 148S, 148W, and/or 148E. However, current and/or future versions of the PoE standard (e.g., IEEE 802.3bt, IEEE 802.3bu, etc.) define increased power limits (e.g., 55 W, 90 W-100 W, etc.). Thus, if a newer PoE standard is implemented and the light head 140N, 140S, 140W, and/or 140E to which electrical power is being supplied includes light bulbs, then one (or two) PoE Ethernet cable coupled between the controller 120 and the light head 140N, 140S, 140W, and/or 140E may be sufficient to allow the light head 140N, 140S, 140W, and/or 140E to enable the lights 144N, 144S, 144W, 144E, 146N, 146S, 146W, 146E, 148N, 148S, 148W, and/or 148E.

In other embodiments, the red lights 144N, 144S, 144W, and/or 144E, the yellow lights 146N, 146S, 146W, and/or 146E, and/or the green lights 148N, 148S, 148W, and/or 148E each include one or more colored light emitting diodes (LEDs) arranged in a matrix pattern. The LEDs may consume less power than the traditional light bulbs (e.g., the LEDs that form a single light 144, 146, or 148 may collectively consume about 1 W, whereas a light bulb may consume more than 100 W) and may last longer than the traditional light bulbs. Given the low power usage, a single PoE Ethernet cable coupled between the controller 120 and a light head 140N, 140S, 140W, and/or 140E may be sufficient to allow the light head 140N, 140S, 140W, and/or 140E to enable the lights 144N, 144S, 144W, 144E, 146N, 146S, 146W, 146E, 148N, 148S, 148W, and/or 148E, regardless of which PoE standard is implemented. In addition, because of the low power usage, the Ethernet cable may require less shielding, reducing the diameter of the Ethernet cable to less than the diameter of the current wires that carry electrical power to the light head lights (e.g., the Ethernet cable diameter may be 5 mm instead of 50 mm, 100 mm, 200 mm, etc.). Thus, adding light heads 140 with LEDs instead of light bulbs to intersections or retrofitting existing light heads 140 to include LEDs instead of light bulbs may result in fewer and less bulky cables or wires being needed to supply enough electrical power to the light heads 140. As a result, an increased number of light heads 140 and/or other components (e.g., sensors, cameras, IoT devices, etc.) can placed at an intersection even with the presence of significant physical space constraints.

Figure 2:
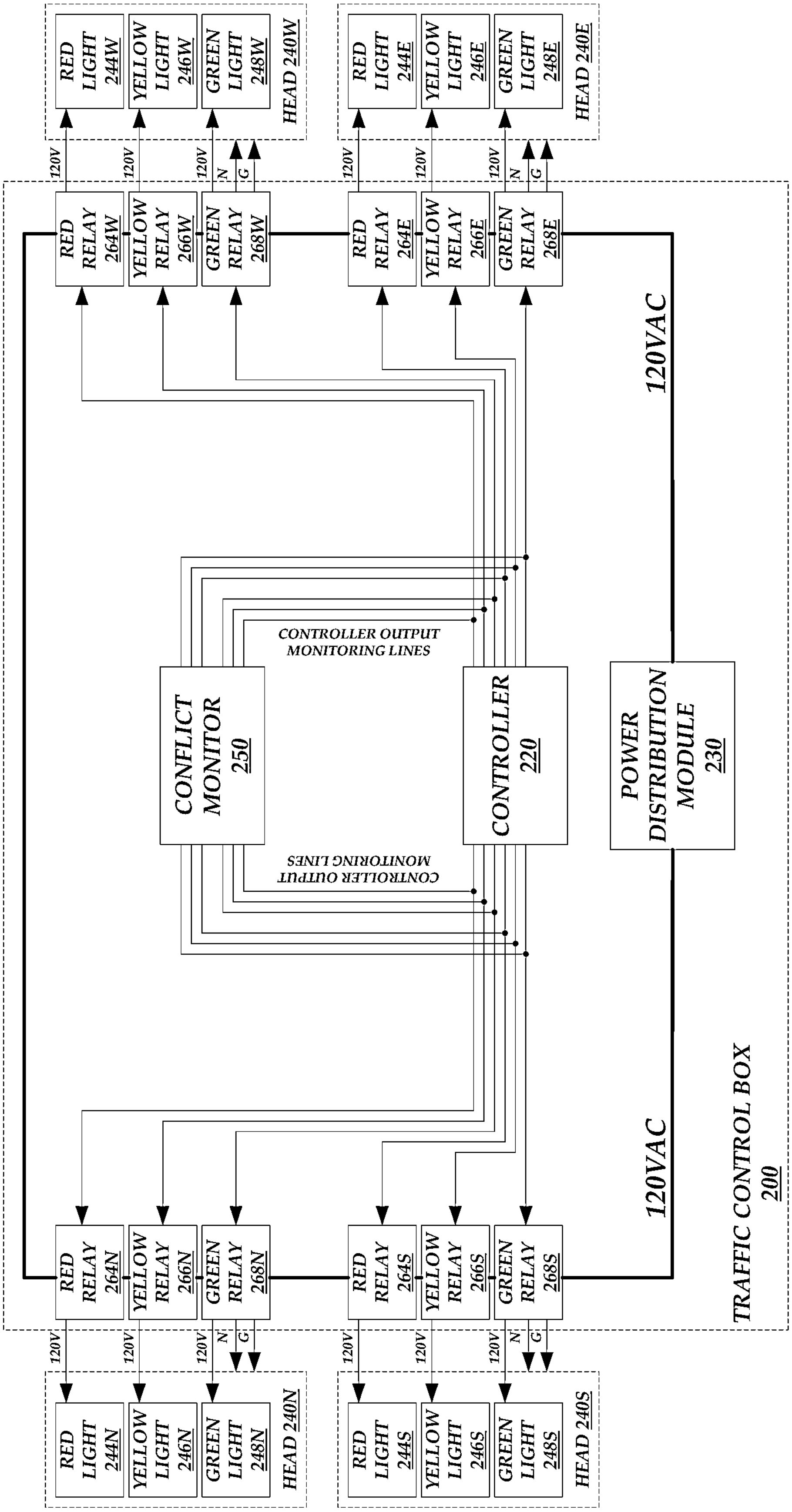
Fig. 2 Prior Art
FIG. 2 illustrates an exemplary block diagram depicting a non network-based vehicle traffic signal control system, which includes traffic control box and various light heads.

Unlike the improved vehicle traffic signal control system illustrated in FIGS. 1A-1B, a non network-based vehicle traffic signal control system includes additional components and additional bulky wires. FIG. 2 illustrates an exemplary block diagram depicting a non network-based vehicle traffic signal control system, which includes traffic control box 200 and various light heads 240N, 240S, 240W, and/or 240E. For simplicity, the non network-based vehicle traffic signal control system depicted in FIG. 2 represents the control system for an intersection that includes four lights that each include a single red, yellow, and green light.

As illustrated in FIG. 2, the traffic control box 200 includes a controller 220, a power distribution module 230, a conflict monitor 250, various red relays 264N, 264S, 264W, and/or 264E, various yellow relays 266N, 266S, 266W, and/or 266E, and various green relays 268N, 268S, 268W, and/or 268E. The power distribution module 230 can be coupled to a mains electricity system and supply electrical power (e.g., 120 VAC) to the red relays 264N, 264S, 264W, and/or 264E, the yellow relays 266N, 266S, 266W, and/or 266E, and the green relays 268N, 268S, 268W, and/or 268E. Each relay 264N, 264S, 264W, 264E, 266N, 266S, 266W, 266E, 268N, 268S, 268W, 268E is coupled to and provides electrical power to a particular light in a light head 240N, 240S, 240W, and/or 240E when the respective relay 264N, 264S, 264W, 264E, 266N, 266S, 266W, 266E, 268N, 268S, 268W, 268E is enabled. For example, each light head 240N, 240S, 240W, 240E includes a red light 244N, 244S, 244W, and/or 244E, a yellow light 246N, 246S, 246W, and/or 246E, and a green light 248N, 248S, 248W, and/or 248E. The red relay 264N is coupled to and provides electrical power to the red light 244N when enabled, the yellow relay 264N is coupled to and provides electrical power to the yellow light 246N when enabled, the green relay 266N is coupled to and provides electrical power to the green light 248N when enabled, the red relay 264S is coupled to and provides electrical power to the red light 244S when enabled, and so on.

The controller 220 determines which lights to enable and/or disable, and sends appropriate control signals to the relays 264N, 264S, 264W, 264E, 266N, 266S, 266W, 266E, 268N, 268S, 268W, and/or 268E to enable or disable the receiving relay. For example, if the controller 220 determines that yellow light 264E of the light head 240E should be enabled, the controller 220 can transmit a control signal to the yellow relay 266E. Reception of the control signal may cause the yellow relay 266E to close a switch that enables the electrical power received from the power distribution module 230 to be supplied to the yellow light 246E or the yellow relay 266E to otherwise cause the electrical power received from the power distribution module 230 to be supplied to the yellow light 246E. Reception of the electrical power causes the yellow light 246E to then illuminate.

The relays 264N, 264S, 264W, 264E, 266N, 266S, 266W, 266E, 268N, 268S, 268W, and/or 268E are further coupled with the respective light heads 240N, 240S, 240W, and/or 240E via a neutral wire and a ground wire. Thus, if a light head 240N, 240S, 240W, and/or 240E includes three lights, then five wires (e.g., three power wires for the three lights, a neutral wire, and a ground wire) may couple the light head 240N, 240S, 240W, and/or 240E to the traffic control box 200. As mentioned above, these wires may be shielded to protect from interference. Thus, five bulky wires may couple the light head 240N, 240S, 240W, and/or 240E to the traffic control box 200. With four light heads 240N, 240S, 240W, and/or 240E at an intersection, this results in 20 bulky wires coupling the light heads 240N, 240S, 240W, and/or 240E to the traffic control box 200.

In the improved vehicle traffic signal control system described herein, however, these 20 bulky wires and the relays 264N, 264S, 264W, 264E, 266N, 266S, 266W, 266E, 268N, 268S, 268W, and/or 268E can be removed. Rather, the electrical power can be continuously supplied directly to the light heads 140N, 140S, 140W, and/or 140E by the controller 120 via one or more Ethernet cables using the PoE standard. The light heads 140N, 140S, 140W, and/or 140E themselves can then control which lights 144N, 144S, 144W, 144E, 146N, 146S, 146W, 146E, 148N, 148S, 148W, and/or 148E receive the electrical power. Specifically, the processors 142N, 142S, 142W, and/or 142E can perform the light activation decision making instead of the controller 120, supplying electrical power only to those lights 144N, 144S, 144W, 144E, 146N, 146S, 146W, 146E, 148N, 148S, 148W, and/or 148E that the processors 142N, 142S, 142W, and/or 142E determine should be enabled. Thus, the processors 142N, 142S, 142W, and/or 142E (or a power distribution component in a light head 140N, 140S, 140W, and/or 140E) can control which lights 144N, 144S, 144W, 144E, 146N, 146S, 146W, 146E, 148N, 148S, 148W, and/or 148E receive the electrical power.

To ensure that conflicts are prevented (e.g., situations in which two green lights in perpendicular directions and both directed to through traffic are both enabled simultaneously), the traffic control box 200 includes the conflict monitor 250. The conflict monitor 250 can monitor the control signals transmitted by the controller 220, identifying any situations in which the controller 220 has transmitted control signals to two or more different relays 264N, 264S, 264W, 264E, 266N, 266S, 266W, 266E, 268N, 268S, 268W, and/or 268E that should not be enabled at the same time (e.g., each of the green relays 268N, 268S, 268W, 268E). If the conflict monitor 250 identifies a situation in which control signals are transmitted to two or more different relays 264N, 264S, 264W, 264E, 266N, 266S, 266W, 266E, 268N, 268S, 268W, and/or 268E that should not be enabled at the same time, then conflict monitor 250 can override the controller 220, transmitting one or more control signals to the relays 264N, 264S, 264W, 264E, 266N, 266S, 266W, 266E, 268N, 268S, 268W, and/or 268E to cause the red lights 244N, 244S, 244W, and/or 244E to flash.

In the improved vehicle traffic signal control system described herein, however, the conflict monitor 250 can be removed. Rather, the functionality provided by the conflict monitor 250 can be implemented by the processors 142N, 142S, 142W, and/or 142E in the light heads 140N, 140S, 140W, and/or 140E. For example, the light head control message, which is provided to each processor 142N, 142S, 142W, 142E, includes a set of rules or instructions that define, at least in part, what conditions should be satisfied in order to enable a red light, a yellow light, and/or a green light and/or what conditions should be satisfied in order to disable a red light, a yellow light, and/or a green light. The processors 142N, 142S, 142W, and/or 142E can communicate with each other, transmitting status messages that provide the current light status (e.g., information indicating which lights 144N, 144S, 144W, 144E, 146N, 146S, 146W, 146E, 148N, 148S, 148W, and/or 148E are enabled and which are not). Thus, each processor 142N, 142S, 142W, 142E can use the status messages and the rules received as part of the light head control message to determine whether it is appropriate (e.g., in terms of avoiding conflicts) to enable or disable a red light 144N, 144S, 144W, and/or 144E, enable or disable a yellow light 146N, 146S, 146W, and/or 146E, and/or enable or disable a green light 148N, 148S, 148W, and/or 148E. As described herein, the processors 142N, 142S, 142W, and/or 142E can also receive status messages from other devices, such as cameras, sensors, IoT devices, etc., that may be considered by the processors 142N, 142S, 142W, and/or 142E when determining what actions are appropriate.

Light Head Communication

As described above, a light head control message includes a set of rules or instructions that define how long a red light, yellow light, and/or green light should be enabled, what conditions should be satisfied in order to enable a red light, a yellow light, and/or a green light, and/or what conditions should be satisfied in order to disable a red light, a yellow light, and/or a green light. As an illustrative example, a light head control message includes information indicating that green lights in the North-South direction (e.g., green lights 148N and 148S) are to remain enabled for 50 seconds, green lights in the East-West direction (e.g., green lights 148W and 148E) are to remain enabled for 30 seconds, and yellow lights in all directions are to remain enabled for 3 seconds (e.g., yellow lights 146N, 146S, 146W, and/or 146E). The light head control message further includes information indicating that green lights in the North-South direction cannot be enabled unless green and yellow lights in the East-West direction are disabled (e.g., green lights 148W and 148E and yellow lights 146W and 146E) and red lights in the East-West direction are enabled (e.g., red lights 144W and 144E). Similarly, the light head control message further includes information indicating that green lights in the East-West direction cannot be enabled unless green and yellow lights in the North-South direction (e.g., green lights 148N and 148S and yellow lights 146N and 146S) are disabled and red lights in the North-South direction are enabled (e.g., red lights 144N and 144S). Each light 144N, 144S, 144W, 144E, 146N, 146S, 146W, 146E, 148N, 148S, 148W, and/or 148E and/or each light head 140N, 140S, 140W, 140E may have a unique identifier, which can be included in the light head control message to specifically identify to which lights 144N, 144S, 144W, 144E, 146N, 146S, 146W, 146E, 148N, 148S, 148W, and/or 148E and/or light heads 140N, 140S, 140W, and/or 140E the rules apply.

Each processor 142N, 142S, 142W, 142E can periodically transmit status messages to the other processors 142N, 142S, 142W, and/or 142E identifying the state of the associated lights via the network switch 125. For example, a processor 142N, 142S, 142W, and/or 142E can transmit a status message when any associated light transitions from an on to off state or from an off to on state. The status message may include an identification of a light 144N, 144S, 144W, 144E, 146N, 146S, 146W, 146E, 148N, 148S, 148W, and/or 148E that has transitioned from one state to another (e.g., the unique identifier of the light 144N, 144S, 144W, 144E, 146N, 146S, 146W, 146E, 148N, 148S, 148W, and/or 148E) and the state to which the light 144N, 144S, 144W, 144E, 146N, 146S, 146W, 146E, 148N, 148S, 148W, and/or 148E transitioned. The processor 142N, 142S, 142W, and/or 142E can generate a separate status message for each independent light 144N, 144S, 144W, 144E, 146N, 146S, 146W, 146E, 148N, 148S, 148W, and/or 148E that changes state and/or the processor 142N, 142S, 142W, and/or 142E can generate a single status message for a plurality of lights 144N, 144S, 144W, 144E, 146N, 146S, 146W, 146E, 148N, 148S, 148W, and/or 148E that change state (where the single status message includes information identifying each light 144N, 144S, 144W, 144E, 146N, 146S, 146W, 146E, 148N, 148S, 148W, and/or 148E that changed state and to what state the lights 144N, 144S, 144W, 144E, 146N, 146S, 146W, 146E, 148N, 148S, 148W, and/or 148E changed). As an illustrative example, if the processor 142S disables the previously enabled green light 148S and enables the previously disabled yellow light 146S, then the processor 142S can either generate and transmit a single status message indicating that green light 148S has transitioned to an off state and that yellow light 146S has transitioned to an on state or generate and transmit two status messages, one for each light transition.

Because the processors 142N, 142S, 142W, and/or 142E each transmit status messages to the other processors 142N, 142S, 142W, and/or 142E, each processor 142N, 142S, 142W, 142E receives information that, in the aggregate, indicates the current status of all the lights 144N, 144S, 144W, 144E, 146N, 146S, 146W, 146E, 148N, 148S, 148W, and/or 148E at the intersection. Thus, each processor 142N, 142S, 142W, 142E can use the status information and the light head control message rules to independently determine which lights 144N, 144S, 144W, 144E, 146N, 146S, 146W, 146E, 148N, 148S, 148W, and/or 148E to enable and/or disable and when such transitions should take place. In this way, the improved vehicle traffic signal control system functions in a distributed manner, where each light head 140N, 140S, 140W, 140E makes its own light activation/deactivation decisions based on the state of other light heads 140N, 140S, 140W, and/or 140E. No light head 140N, 140S, 140W, and/or 140E necessarily must act as a master light head 140N, 140S, 140W, and/or 140E, instructing other slave light heads 140N, 140S, 140W, and/or 140E which lights 144N, 144S, 144W, 144E, 146N, 146S, 146W, 146E, 148N, 148S, 148W, and/or 148E to enable and/or disable and when such transitions should take place. However, in other embodiments, one light head 140N, 140S, 140W, or 140E may act as a master light head 140N, 140S, 140W, or 140E and control the light activation/deactivation of other light heads 140N, 140S, 140W, and/or 140E.

The distributed processing of the improved vehicle traffic signal control system further allows the light heads 140N, 140S, 140W, and/or 140E to perform continuous or non-continuous self-diagnostic tests. For example, the light heads 140N, 140S, 140W, and/or 140E can perform checks to determine whether lights 144N, 144S, 144W, 144E, 146N, 146S, 146W, 146E, 148N, 148S, 148W, and/or 148E are working properly, signals are being received from other light heads 140N, 140S, 140W, and/or 140E and/or the controller 120, etc. Once a single instance of the self-diagnostic test is complete, the light heads 140N, 140S, 140W, and/or 140E can report to the controller 120 or a remote maintenance system the results of the self-diagnostic test. The controller 120 or remote maintenance system can then notify and/or dispatch technicians if a light head 140N, 140S, 140W, and/or 140E reports a problem.

In some embodiments, the controller 120 periodically transmits beacon signals to one or more of the processors 142N, 142S, 142W, and/or 142E to indicate that the controller 120 is still operating or functional. In addition, the controller 120 can include commands in the beacon signals that cause the processors 142N, 142S, 142W, and/or 142E to perform certain actions. For example, the controller 120 can include a termination command that causes the processors 142N, 142S, 142W, and/or 142E receiving the beacon signal to terminate an existing state. The controller 120 may include a termination command in a beacon signal if, for example, an emergency vehicle needs to cross an intersection. As an illustrative example, upon receiving a termination command in a beacon signal transmitted by the controller 120, the processor 142N can disable the green light 148N (if enabled) or the yellow light 146N (if enabled) even if it is not yet time for the green light 148N or yellow light 146N to transition from an on state to an off state. Optionally, if the processor 142N receives the termination command while the red light 144N is enabled, the processor 142N may not transition the red light 144N from an on state to an off state for a threshold period of time (e.g., as indicated in the termination command) even if it is time for the red light 144N to transition from an on state to an off state.

In alternate embodiments, the controller 120 and/or the entire traffic control box 100 are not present. Rather, one light head 140N, 140S, 140W, or 140E can be designated as the "controller" and perform some or all of the functions described herein as being performed by the controller 120 (e.g., generate and transmit light head control messages to other light heads 140N, 140S, 140W, and/or 140E) in addition to performing the light head 140N, 140S, 140W, and/or 140E functions described herein. Because no traffic control box 100 may be present, the light heads 140N, 140S, 140W, and/or 140E can communicate wirelessly (e.g., each light head 140N, 140S, 140W, and/or 140E may include a wireless router). In addition, the light heads 140N 140S, 140W, and/or 140E can be coupled directly to an energy source. For example, solar panels, piezoelectric or other types of motion-based energy harvesting devices, and/or the like can be coupled to a light pole to which a light head 140N, 140S, 140W, and/or 140E is coupled to supply power to the light head 140N, 140S, 140W, and/or 140E. As another example, the light heads 140N, 140S, 140W, and/or 140E can be coupled to an above-ground or below-ground power source (e.g., a mains electricity system). Thus, the cost of the improved vehicle traffic signal control system can be reduced due to the absence of the controller 120 and/or traffic control box 100. In addition, the reliability of the light heads 140N, 140S, 140W, and/or 140E may be increased because a hardware failure or other similar issue affecting a controller 120 or the traffic control box 100, especially those issues that affect ground equipment more than aerial equipment (e.g., a vehicle hitting and damaging the traffic control box 100 and/or other equipment, flooding, etc.), is not a concern. As an illustrative example, this type of improved vehicle traffic signal control system can be set up on a rural road by a school that has a crosswalk. One of more light heads may communicate wirelessly and receive power from solar panels coupled to one or more light poles. Thus, no traffic control box 100 or other ground equipment may be present. The light heads may normally enable green lights to allow traffic on the rural road to pass the crosswalk. However, if a crosswalk button is selected, some or all the light heads may be notified accordingly, causing the light heads to disable the green lights and either enable the red lights or flash the yellow lights, thereby indicating that pedestrians are in the area and may be crossing.

Figure 3A:
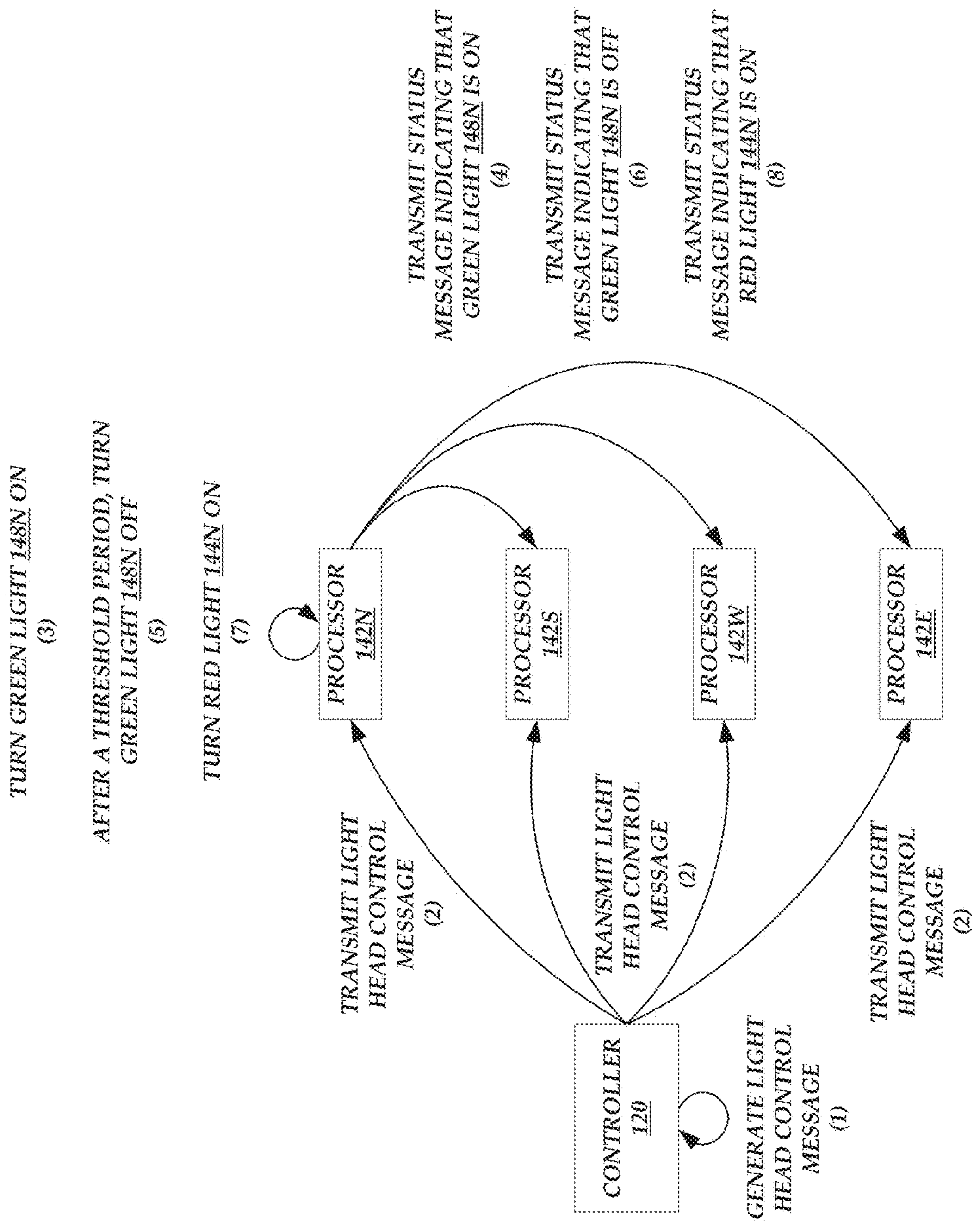
FIGS. 3A-3B are block diagrams of the operations performed by the components of the improved vehicle traffic signal control system to enable and/or disable light head lights.
Figure 3B:
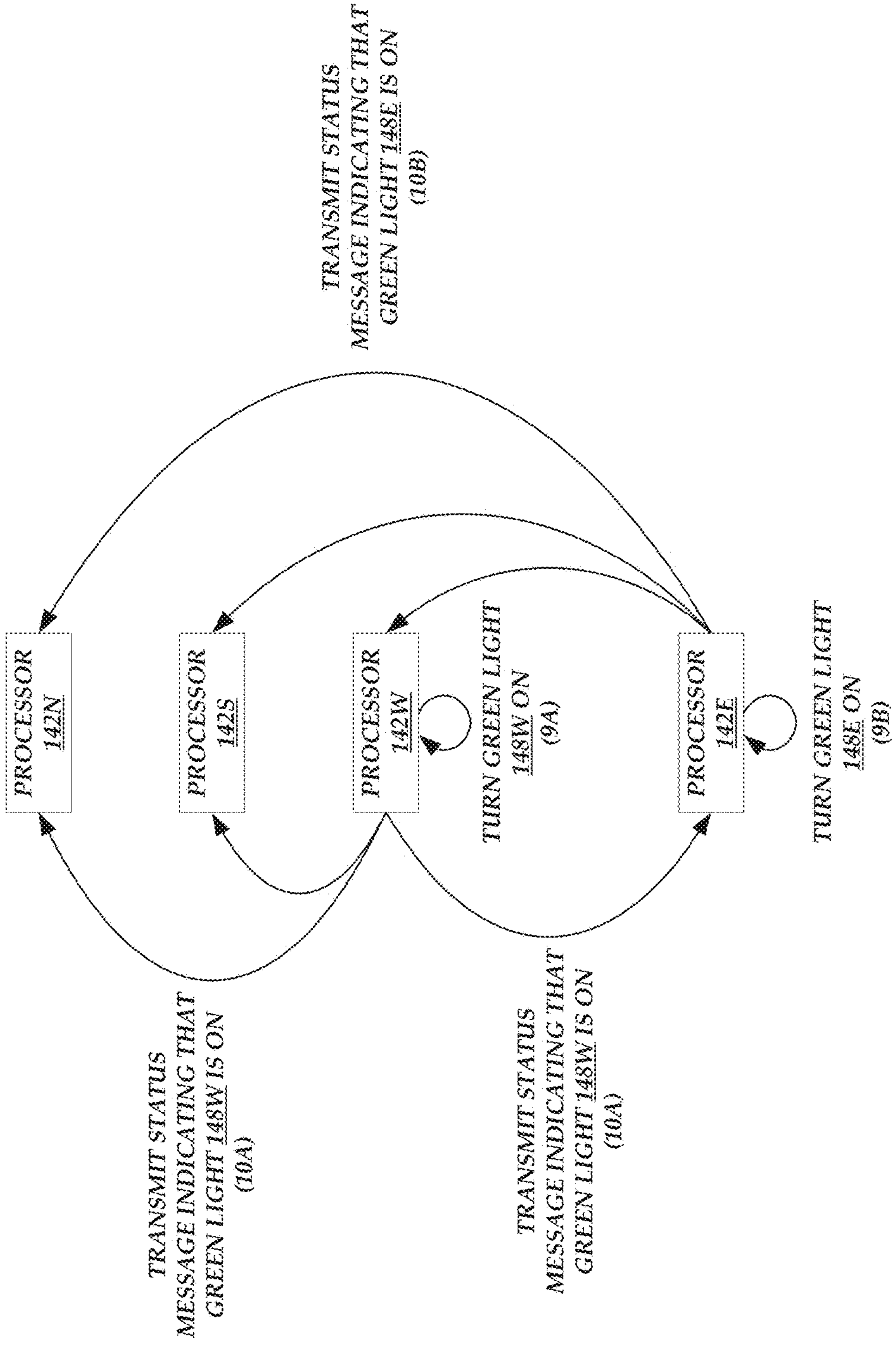

FIGS. 3A-3B are block diagrams of the operations performed by the components of the improved vehicle traffic signal control system to enable and/or disable light head 140N, 140S, 140W, and/or 140E lights. As illustrated in FIG. 3A, the controller 120 generates a light head control message at (1). As an illustrative example, the light head control message includes data indicating that green lights 148N and 148S are to remain enabled for 50 seconds, green lights 148W and 148E are to remain enabled for 30 seconds, and yellow lights 146N, 146S, 146W, and/or 146E are to remain enabled for 3 seconds. The light head control message further includes data indicating that green lights 148N and 148S cannot be enabled unless green lights 148W and 148E and yellow lights 146W and 146E are disabled and red lights 144W and 144E are enabled, and that green lights 148W and 148E cannot be enabled unless green lights 148N and 148S and yellow lights 146N and 146S are disabled and red lights 144N and 144S are enabled.

The controller 120 then transmits the light head control message to the processors 142N, 142S, 142W, and/or 142E at (2). The controller 120 can periodically generate new light head control messages and transmit such messages to the processors 142N, 142S, 142W, and/or 142E. For example, traffic patterns may change based on the time of day, the day of the week, the week of the month, the month of the year, etc. In response, it may be desirable to adjust how long lights are enabled and/or disabled depending on the time, day, week, month, year, etc. The controller 120 can store a schedule of light enablement/disablement times, and generate and transmit a new light head control message when the schedule indicates that the light enablement/disablement times should change given the current time, day, week, month, year, etc. Alternatively, the initial light head control message can include a plurality of light enablement/disablement times, where each light enablement/disablement time is associated with a particular time, day, week, month, year, etc. The processors 142N, 142S, 142W, and/or 142E can then identify the current time and make light enablement and/or disablement determinations based at least in part on the current time. As another example, the controller 120 can generate and transmit a new light head control message if a new sensor or other component is added to an intersection that affects when lights 144N, 144S, 144W, 144E, 146N, 146S, 146W, 146E, 148N, 148S, 148W, and/or 148E should be enabled and/or disabled.

In the example depicted in FIG. 3A, the processor 142N has determined that the rules included in the received light head control message indicate that green light 148N can be turned on (e.g., green lights 148W and 148E are off, yellow lights 146W and 146E are off, and red lights 144W and 144E are on). Thus, the processor 142N supplies electrical power received via the Ethernet cable to the green light 148N, thereby turning the green light 148N on at (3). In some embodiments, not shown, the processor 142S makes the same determination (e.g., because light heads 140N and 140S face opposite directions) and turns on the green light 148S. In response to determining to turn on the green light 148N, the processor 142N generates and transmits a status message indicating that the green light 148N is on at (4) to the processors 142S, 142W, and/or 142E.

After a threshold period of time defined in the light head control message (e.g., 50 seconds), the processor 142N determines that the green light 148N should be disabled. Thus, after the threshold period of time, the processor 142N turns the green light 148N off at (5) (e.g., by stopping the supply of electrical power to the green light 148N). In response, the processor 142N generates and transmits a status message indicating that the green light 148N is off at (6) to the processors 142S, 142W, and/or 142E.

Once the green light 148N is off, the processor 142N can turn on the yellow light 146N for a threshold period of time defined in the light head control message (e.g., 3 seconds), and then turn on the red light 144N at (7) after the yellow light 146N is turned off. The processor 142N can then generate and transmit a status message indicating that the red light 144N is on at (8) to the processors 142S, 142W, and/or 142E.

In other embodiments, not shown, the processor 142N combines one or more of the generated status messages. For example, the processor 142N can combine the status message indicating that the green light 148N is off and the status message indicating that the yellow light 146N is on, transmitting a single status message to indicate the two light transitions.

At this stage, the processors 142S, 142W, and/or 142E have received information indicating that green light 148N is off, yellow light 146N is off, and red light 144N is on. Processors 142N, 142W, and 142E may have also received information indicating that green light 148S is off, yellow light 146S is off, and red light 144S is on (e.g., from the processor 142S). Per the light head control message rules, the processors 142W and 142E can now enable green lights 148W and 148E, respectively. Thus, the processors 142W and 142E can disable the red lights 144W and 144E, respectively, and transmit corresponding status messages to the other processors 142N, 142S, 142W, and/or 142E. The processor 142W can then turn on green light 148W at (9A) and the processor 142E can turn on green light 148E at (9B), as illustrated in FIG. 3B.

Optionally, the processors 142W and 142E may turn on the respective green lights 148W and 148E a threshold time period (e.g., 1 second, 2 seconds) after receiving the status message indicating that the red light 144N is on. Thus, the red lights 144N, 144S, 144W, and/or 144E may each be on at the same time, which may ensure that two drivers traveling in perpendicular directions could not both argue that they had a green light and the other driver had a red light if an accident were to occur, or which may allow a driver who meets the requirements of being in the intersection prior to the light turning red to exit the intersection prior to traffic in a perpendicular direction entering the intersection.

Alternatively, the processors 142W and 142E may turn on the respective green lights 148W and 148E after receiving the status message indicating that the red light 144N is on and after a determination is made that no vehicles and/or pedestrians are present in the intersection 180. For example, as discussed below, other components, such as sensors, cameras, and/or IoT devices, can be coupled to a light head. One or more sensors (e.g., a light detection and ranging (LIDAR) sensor, a radio detection and ranging (RADAR) sensor, an infrared sensor, a motion detector, a presence detector, etc.) and/or a camera can be coupled to the light head 140N and output signals to the processor 142N. Similarly, one or more sensors (e.g., a LIDAR sensor, a RADAR sensor, an infrared sensor, a motion detector, a presence detector, etc.) and/or a camera can be coupled to the light head 140S output signals to the processor 142S. The light head 140N sensor(s) and/or camera may face South and can be used individually or in conjunction to identify objects (e.g., vehicles, pedestrians, bicyclists, etc.) that may be present in the southern half of the intersection 180, in the northern half of the intersection 180, in the northeastern quadrant of the intersection 180, in the southeastern quadrant of the intersection 180, in the northwestern quadrant of the intersection 180, in the southwestern quadrant of the intersection 180, and/or any combination thereof. The light head 140S sensor(s) and/or camera may face North and can be used individually or in conjunction to identify objects (e.g., vehicles, pedestrians, etc.) that may be present in a portion of the intersection 180 not monitored by the light head 140N sensor and/or camera (e.g., if the light head 140N sensor(s) and/or camera identifies objects in the southern half of the intersection 180, then the light head 140S sensor(s) and/or camera identifies objects in the northern half of the intersection 180, if the light head 140N sensor(s) and/or camera identifies objects in the southeastern quadrant of the intersection 180, then the light head 140S sensor(s) and/or camera may identify objects in the northwestern quadrant of the intersection 180, etc.). Similarly, light head 140W sensor(s) and/or camera and/or light head 140E sensor(s) and/or camera can monitor portions of the intersection 180 not monitored by the light head 140N sensor(s) and/or camera and/or the light head 140S sensor(s) and/or camera. Alternatively or in addition, some or all of the light head 140N, 140S, 140W, and/or 140E sensor(s) and/or camera(s) can monitor the same portions of the intersection 180. In an embodiment, the intersection 180 includes crosswalks for monitoring purposes. If a sensor and/or camera detects an object in a monitored portion of the intersection 180, the sensor and/or camera can transmit a signal indicating that an object is detected in the monitored portion. The processor 142N, 142S, 142W, and/or 142E that receives such a signal can transmit an object detection message to the other processors 142N, 142S, 142W, and/or 142E indicating that an object is detected in a portion of the intersection 180. In response to receiving such a message (and/or in response to generating an object detection message themselves), the processors 142W and 142E may not turn on the respective green lights 148W and 148E even after receiving the status message indicating that the red light 144N is on. Rather, the processors 142W and 142E may wait until one or more object detection messages are received (and/or generated by themselves) indicating that no object is detected in any portion of the intersection 180 before turning on the respective green lights 148W and 148E. As an illustrative example, if each light head sensor(s) and/or camera monitors a single quadrant of the intersection 180, then the processor 142W may turn on the green light 148W after receiving a signal from the light head 140W sensor(s) and/or camera indicating that no object is detected in the northeastern quadrant of the intersection 180, after receiving an object detection message from the processor 142N indicating that no object is detected in the southeastern quadrant of the intersection 180, after receiving an object detection message from the processor 142E indicating that no object is detected in the southwestern quadrant of the intersection 180, and after receiving an object detection message from the processor 142W indicating that no object is detected in the northwestern quadrant of the intersection 180. However, the processor 142W may not turn on the green light 148W after receiving a signal from the light head 140W sensor(s) and/or camera indicating that no object is detected in the northeastern quadrant of the intersection 180, after receiving an object detection message from the processor 142N indicating that no object is detected in the southeastern quadrant of the intersection 180, after receiving an object detection message from the processor 142E indicating that an object is detected in the southwestern quadrant of the intersection 180, and after receiving an object detection message from the processor 142W indicating that no object is detected in the northwestern quadrant of the intersection 180. The processor 142W may wait for another object detection message from the processor 142E indicating that no object is detected in the southwestern quadrant of the intersection 180 before turning on the green light 148W. Some or all of the processors 142N, 142S, 142W, and/or 142E may generate and transmit an object detection message after receiving a status message indicating that a red light 144N, 144S, 144W, and/or 144E is on. In addition, if a processor 142N, 142S, 142W, and/or 142E generates and transmits an object detection message indicating that an object is detected, the processor 142N, 142S, 142W, and/or 142E may generate another object detection message indicating that no object is detected when an object is no longer detected. Thus, processors 142N, 142S, 142W, and/or 142E may wait for status message indicating that red lights 144N, 144S, 144W, and/or 144E are on and object detection messages that collectively indicate that no objects are detected in the intersection 180 before turning on any green lights 148N, 148S, 148W, and/or 148E. In this way, the light heads 140N, 140S, 140W, and/or 140E and corresponding sensor(s) and/or camera(s) can reduce the likelihood of accidents (e.g., T-bone collisions or other cross-traffic accidents) by preventing traffic from seeing green lights until the intersection is clear of cross-traffic.

In response to the green lights 148W and 148E being turned on, the processor 142W generates and transmits a status message to processors 142N, 142S, and 142E indicating that the green light 148W is on at (10A), and the processor 142E generates and transmits a status message to processors 142N, 142S, and 142W indicating that the green light 148E is on at (10B). By receiving the status messages, the processors 142N and 142S determine that the light head control message rules indicate that green lights 148N and 148S cannot be enabled, at least not until green lights 148W and 148E are disabled (e.g., after 30 seconds as defined in the light head control message). In this way, the processors 142N, 142S, 142W, and/or 142E perform their own conflict monitoring, thereby eliminating the need to include a separate, physical conflict monitoring device in the traffic signal box 100.

Alternatively, not shown, the controller 120 may not transmit one or more light head control messages, allowing the processors 142N, 142S, 142W, and/or 142E to control light transitions thereafter. Rather, the controller 120 can periodically (e.g., every second) transmit a light head control message to each processor 142N, 142S, 142W, and/or 142E indicating in which state each respective light should be. For example, the light head control message can indicate whether lights 144N, 144S, 144W, 144E, 146N, 146S, 146W, 146E, 148N, 148S, 148W, and/or 148E should be on or off. The status (e.g., whether a light should be on or off) for each of the lights 144N, 144S, 144W, 144E, 146N, 146S, 146W, 146E, 148N, 148S, 148W, and/or 148E can be included in the same light head control message, the status for each light 144N, 144S, 144W, 144E, 146N, 146S, 146W, 146E, 148N, 148S, 148W, and/or 148E corresponding to a particular light head 140N, 140S, 140W, and/or 140E can be included in a light head control message associated with and transmitted to the particular light head 140N, 140S, 140W, and/or 140E, the status for a single light 144N, 144S, 144W, 144E, 146N, 146S, 146W, 146E, 148N, 148S, 148W, or 148E or a group of lights 144N, 144S, 144W, 144E, 146N, 146S, 146W, 146E, 148N, 148S, 148W, and/or 148E can be included in a single light head control message, and/or any combination thereof. Each processor 142N, 142S, 142W, and/or 142E can then enable or disable the respective lights according to the information provided in the received light head control message.

By periodically transmitting light head control messages to the processors 142N, 142S, 142W, and/or 142E indicating in which state each respective light should be, the controller 120 can ensure that clock errors do not lead to potential accidents. For example, the processors 142N, 142S, 142W, and/or 142E may use internal clocks to determine when lights should transition from one state to another. If there is an error in any one of the clocks of the processors 142N, 142S, 142W, and/or 142E, lights may transition at the wrong time, leading to situations like green light 148N turning on before red light 144E turns on. The controller 120 then can use light head control messages to avoid issues that arise from clock errors.

Additional Components in the Improved Vehicle Traffic Signal Control System

FIG. 1A illustrates a basic example of the improved vehicle traffic signal control system in which an intersection includes four light heads 140N, 140S, 140W, and/or 140E. However, by implementing the PoE standard and network technology, the improved vehicle traffic signal control system is flexible and can support the inclusion of sensors, cameras, IoT devices, and/or other components. For example, intersections often include crosswalk buttons and signs, where a crosswalk button, when activated, causes a crosswalk sign to signal to a pedestrian that it is safe to cross the street. One or more crosswalk buttons can be configured to communicate with the light heads 140N, 140S, 140W, and/or 140E via the network switch 125.

Figure 4A:
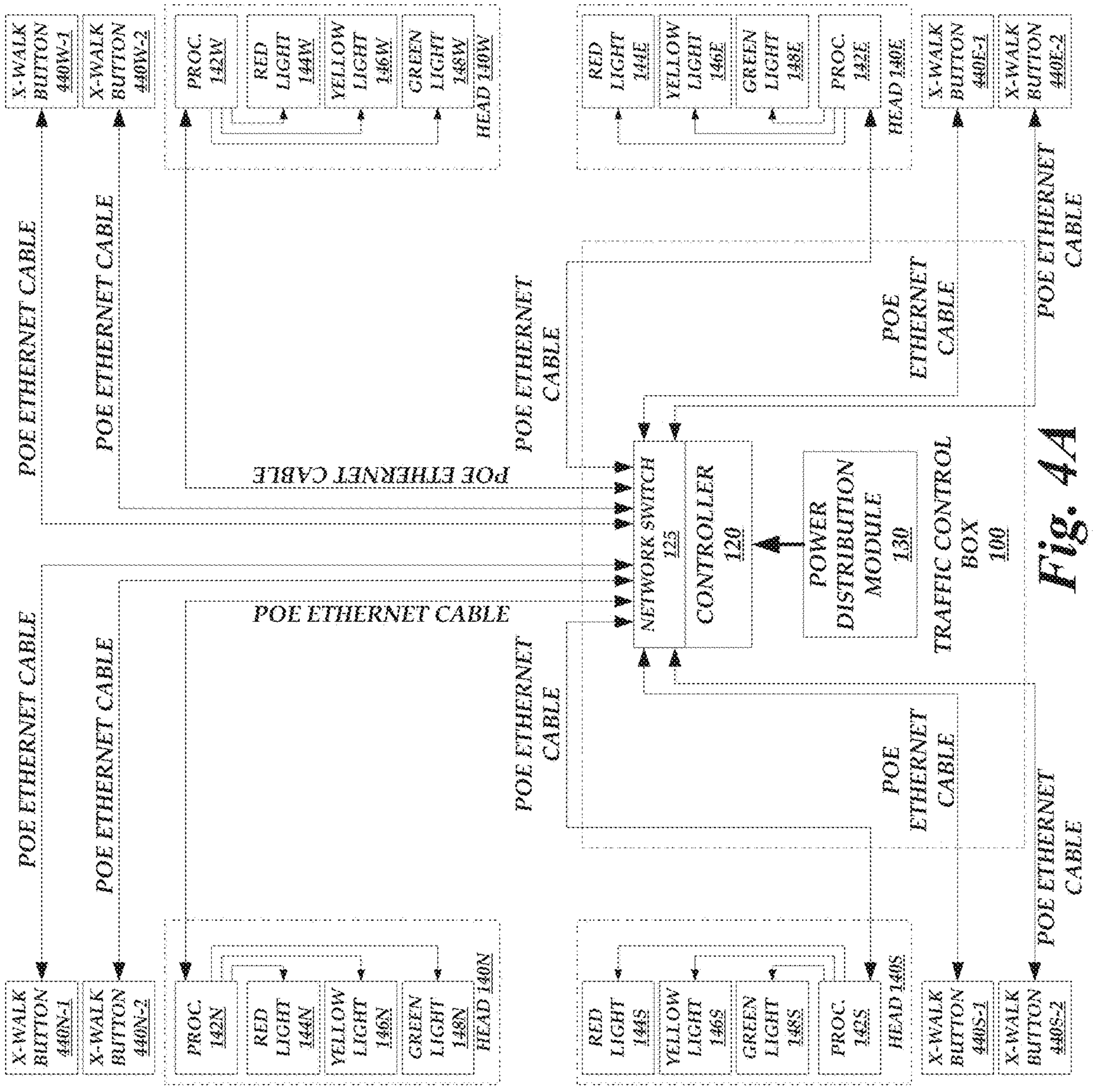
FIG. 4A illustrates an exemplary block diagram depicting a version of the improved vehicle traffic signal control system of FIG. 1A that includes various crosswalk buttons.

FIG. 4A illustrates an exemplary block diagram depicting a version of the improved vehicle traffic signal control system of FIG. 1A that includes various crosswalk buttons 440. For example, the crosswalk buttons 440 may be located on poles or other structures present near the intersection, such as on poles that support the light heads 140N, 140S, 140W, and/or 140E.

Figure 4B:
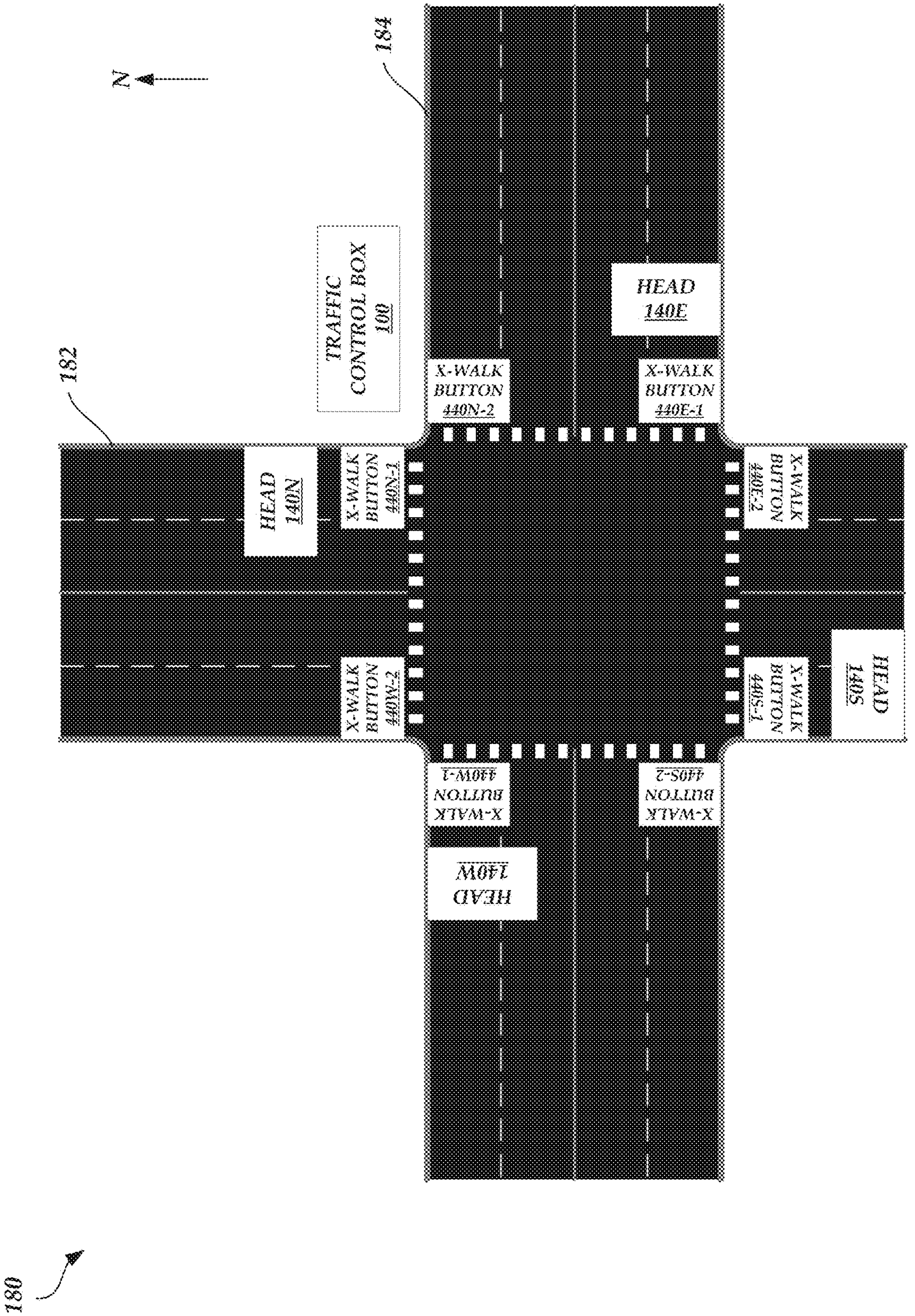
FIG. 4B illustrates an exemplary location of the crosswalk buttons of FIG.

As an example, FIG. 4B illustrates an exemplary location of the crosswalk buttons 440. For example, (1) crosswalk button 440N-1 can be located on the pole that supports the light head 140N and, when selected, allow pedestrians to cross from the East side of the street 182 to the West side of the street 182; (2) crosswalk button 440N-2 can be located on a pole near the Northeast corner of the intersection 180 and, when selected, allow pedestrians to cross from the North side of the street 184 to the South side of the street 184; (3) crosswalk button 440S-1 can be located on the pole that supports the light head 140S and, when selected, allow pedestrians to cross from the West side of the street 182 to the East side of the street 182; (4) crosswalk button 440S-2 can be located on a pole near the Southwest corner of the intersection 180 and, when selected, allow pedestrians to cross from the South side of the street 184 to the North side of the street 184; (5) crosswalk button 440W-1 can be located on the pole that supports the light head 140W and, when selected, allow pedestrians to cross from the North side of the street 184 to the South side of the street 184; (6) crosswalk button 440W-2 can be located on a pole near the Northwest corner of the intersection 180 and, when selected, allow pedestrians to cross from the West side of the street 182 to the East side of the street 182; (7) crosswalk button 440E-1 can be located on the pole that supports the light head 140E and, when selected, allow pedestrians to cross from the South side of the street 184 to the North side of the street 184; and (8) crosswalk button 440E-2 can be located on a pole near the Southeast corner of the intersection 180 and, when selected, allow pedestrians to cross from the East side of the street 182 to the West side of the street 182.

When a crosswalk button 440 is enabled and causes an associated crosswalk sign to transition from signaling that pedestrians may not cross (e.g., represented as a red hand) to signaling that pedestrians may cross (e.g., represented as a white pedestrian symbol) and/or when the crosswalk sign transitions from signaling pedestrians may cross to signaling that pedestrians may not cross, the crosswalk button 440 can generate and transmit a status message to the light heads 140N, 140S, 140W, and/or 140E. The status message may include information indicating which crosswalk button 440 is transmitting the status message (e.g., each crosswalk button 440 may be associated with a unique identifier that can be included in the status message) and whether the crosswalk button 440 is enabled and allowing pedestrians to cross (e.g., the crosswalk sign signals pedestrians may cross) or whether the crosswalk button 440 is disabled and not allowing pedestrians to cross (e.g., the crosswalk sign signals pedestrians may not cross).

In addition to including information identifying what state other lights 144N, 144S, 144W, 144E, 146N, 146S, 146W, 146E, 148N, 148S, 148W, and/or 148E must be in for a processor 142N, 142S, 142W, and/or 142E to enable or disable a light 144N, 144S, 144W, 144E, 146N, 146S, 146W, 146E, 148N, 148S, 148W, and/or 148E, the light head control message previously transmitted by the controller 120 to the light heads 140N, 140S, 140W, and/or 140E may include one or more rules or instructions defining what states the crosswalk buttons 440 must be in for the processor 142N, 142S, 142W, and/or 142E to enable or disable a light 144N, 144S, 144W, 144E, 146N, 146S, 146W, 146E, 148N, 148S, 148W, and/or 148E. As an illustrative example, a light head control message includes information indicating that green lights in the North-South direction (e.g., green lights 148N and 148S) cannot be enabled unless crosswalk buttons that allow pedestrians to cross in the East-West direction (e.g., crosswalk buttons 440N-1, 440S-1, 440W-2, and 440E-2) are disabled, and green lights in the East-West direction (e.g., green lights 148W and 148E) cannot be enabled unless crosswalk buttons that allow pedestrians to cross in the North-South direction (e.g., crosswalk buttons 440N-2, 440S-2, 440W-1, and 440E-1) are disabled.

Figure 5A:
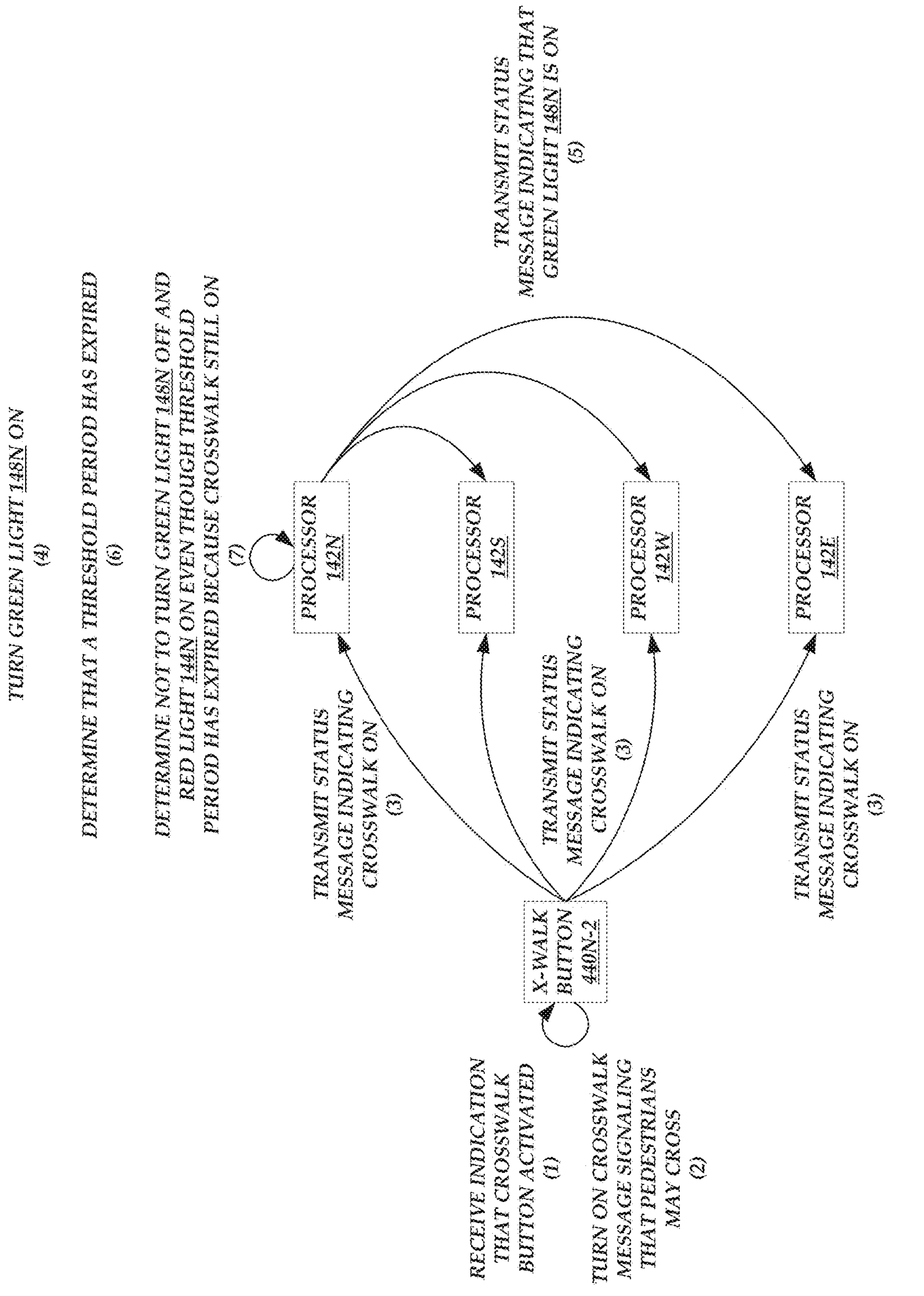
FIGS. 5A-5B are additional block diagrams of the operations performed by the components of the improved vehicle traffic signal control system to enable and/or disable light head lights.
Figure 5B:
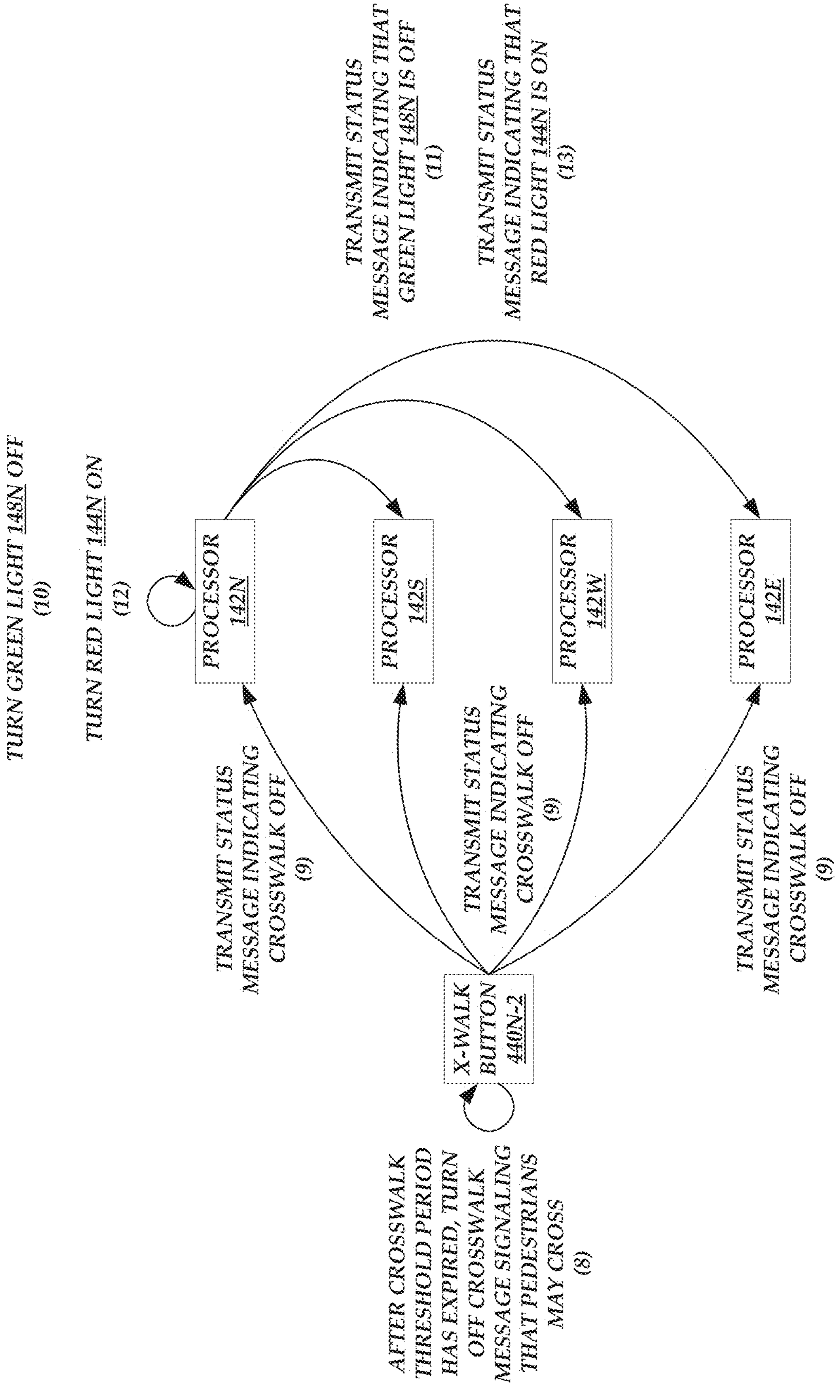

In some embodiments, the rules in the light head control message can conflict. For example, the light head control message may indicate that green lights in the East-West direction (e.g., green lights 148W and 148E) and red lights in the North-South direction (e.g., red lights 144N and 144S) are to remain enabled for 30 seconds, but crosswalk buttons that allow pedestrians to cross in the East-West direction (e.g., crosswalk buttons 440N-1, 440S-1, 440W-2, and 440E-2) may cause crosswalk signs to signal that pedestrians may cross for 40 seconds. Because the rules may further indicate that green lights in the North-South direction (e.g., green lights 148N and 148S) cannot be enabled while the crosswalk buttons that allow pedestrians to cross in the East-West direction are enabled, the green lights in the East-West direction and the red lights in the North-South direction may remain enabled for longer than 30 seconds in situations in which the East-West crosswalk buttons are enabled. Accordingly, the light head control message may indicate a priority or hierarchy of rules such that the processors 142N, 142S, 142W, and/or 142E may not inadvertently perform conflicting actions (e.g., allowing green lights in the North-South direction to turn on while the East-West crosswalk buttons are still enabled). In the example described above, the priority of rules may be as follows:

1. Green lights in the North-South direction (e.g., green lights 148N and 148S) cannot be enabled unless green and yellow lights in the East-West direction (e.g., green lights 148W and 148E and yellow lights 146W and 146E) are off, red lights in the East-West direction (e.g., red lights 144W and 144E) are on, and crosswalk buttons in the East-West direction (e.g., crosswalk buttons 440N-1, 440S-1, 440W-2, and 440E-2) are disabled
2. Crosswalk buttons in the East-West direction (e.g., crosswalk buttons 440N-1, 440S-1, 440W-2, and 440E-2) are enabled for 40 seconds
3. Green lights in the East-West direction (e.g., green lights 148W and 148E) and red lights in the North-South direction (e.g., red lights 144N and 144S) remain enabled while the crosswalk buttons in the East-West direction (e.g., crosswalk buttons 440N-1, 440S-1, 440W-2, and 440E-2) are enabled
4. Red lights in the North-South direction (e.g., red lights 144N and 144S) are enabled for 30 seconds
5. Green lights in the East-West direction (e.g., green lights 148W and 148E) are enabled for 30 seconds FIGS. 5A-5B are additional block diagrams of the operations performed by the components of the improved vehicle traffic signal control system to enable and/or disable light head 140N, 140S, 140W, and/or 140E lights. As illustrated in FIG. 5A, the crosswalk button 440N-2 receives an indication that the crosswalk button 440N-2 has been activated at (1). In response, the crosswalk button 440N-2 can instruct the associated crosswalk sign to turn on a crosswalk message signaling that pedestrians may cross at (2). In some embodiments, the crosswalk buttons 440 can receive light head control messages and/or status messages in addition to the light heads 140N, 140S, 140W, and/or 140E. The crosswalk button 440N-2 may then instruct the associated crosswalk sign to turn on the crosswalk message after receiving status messages indicating that green lights 148W and 148E are off, yellow lights 146W and 146E are off, and red lights 144W and 144E are on (e.g., the light head control message may include a rule indicating that this condition must be satisfied in order for the associated crosswalk sign to be allowed to turn on the crosswalk message).

After causing the crosswalk message to turn on, the crosswalk button 440N-2 can generate and transmit a status message to the processors 142N, 142S, 142W, and/or 142E indicating that the crosswalk is on at (3). Thus, the processors 142N, 142S, 142W, and/or 142E can receive information indicating that a North-South crosswalk is enabled, thereby preventing the processors 142W and 142E from enabling the East-West green lights 148W and 148E, respectively.

Because the North-South crosswalk being enabled does not prevent a North-South green light 148N and 148S from being enabled, the processor 142N may turn the green light 148N on at (4). In response, the processor 142N generates and transmits a status message to the processors 142S, 142W, and/or 142E indicating that the green light 148N is on at (5). Similarly, the processor 142S may turn the green light 148S on transmit a corresponding status message.

The processor 142N may then determine that a threshold period of time has expired at (6). For example, the threshold period of time may be the period of time that the green light 148N is to remain on as defined by the light head control message (e.g., 30 seconds). However, the processor 142N has not yet received a status message from the crosswalk button 440N-2 indicating that the crosswalk message signaling that pedestrians may cross has been turned off. Thus, the processor 142N determines at (7) not to turn the green light 148N off and the red light 144N on even though the threshold period of time has expired because the crosswalk message is still on.

At a later time, such as after a crosswalk threshold period of time (e.g., as defined by the light head control message, such as 40 seconds) has expired, the crosswalk button 440N-2 causes the crosswalk sign to turn off the crosswalk message signaling that pedestrians may cross at (8), as illustrated in FIG. 5B. In response, the crosswalk button 440N-2 generates and transmits to the processors 142N, 142S, 142W, and/or 142E a status message indicating that the crosswalk is off at (9).

Because the threshold period of time for keeping the green light 148N enabled has already expired, the processor 142N may turn the green light 148N off at (10) after receiving the status message from the crosswalk button 440N-2. In response, the processor 142N generates and transmits to the processors 142S, 142W, and/or 142E a status message indicating that the green light 148N is off at (11). The processor 142N can then enable the yellow light 146N for a defined period of time (e.g., 3 seconds), transmitting a corresponding status message indicating that the yellow light 146N is on and transmitting a corresponding status message indicating that the yellow light 146N is off after the defined period of time. The processor 142N can then turn the red light 144N on at (12) and generate and transmit a status message to the processors 142S, 142W, and/or 142E indicating that the red light 144N is on at (13).

In some embodiments, not shown, the status messages transmitted by the 142N, 142S, 142W, and/or 142E and/or other crosswalk buttons 440 are also transmitted to the crosswalk button 440N-2. The crosswalk button 440N-2 can use the status messages to determine when to cause the associated crosswalk sign to turn on the crosswalk message signaling that pedestrians may cross.

FIGS. 3A-3B and 5A-5B are not meant to be limiting as other sequences of operations, not shown, can be performed by the controller 120 and/or the processors 142N, 142S, 142W, and/or 142E to enable and/or disable lights 144N, 144S, 144W, 144E, 146N, 146S, 146W, 146E, 148N, 148S, 148W, and/or 148E and/or crosswalk buttons 440N-1, 440N-2, 440S-1, 440S-2, 440W-1, 440W-2, 440E-1, and/or 440E-2. In general, typical vehicle traffic signal control systems include a centralized processing unit that then activates outputs and receives data from sensors, using the received data to make decisions. However, the improved vehicle traffic signal control system can use multiple processing units located throughout the intersection (e.g., in the different light heads 140N, 140S, 140W, and 140E) to make decisions.

Figure 6:
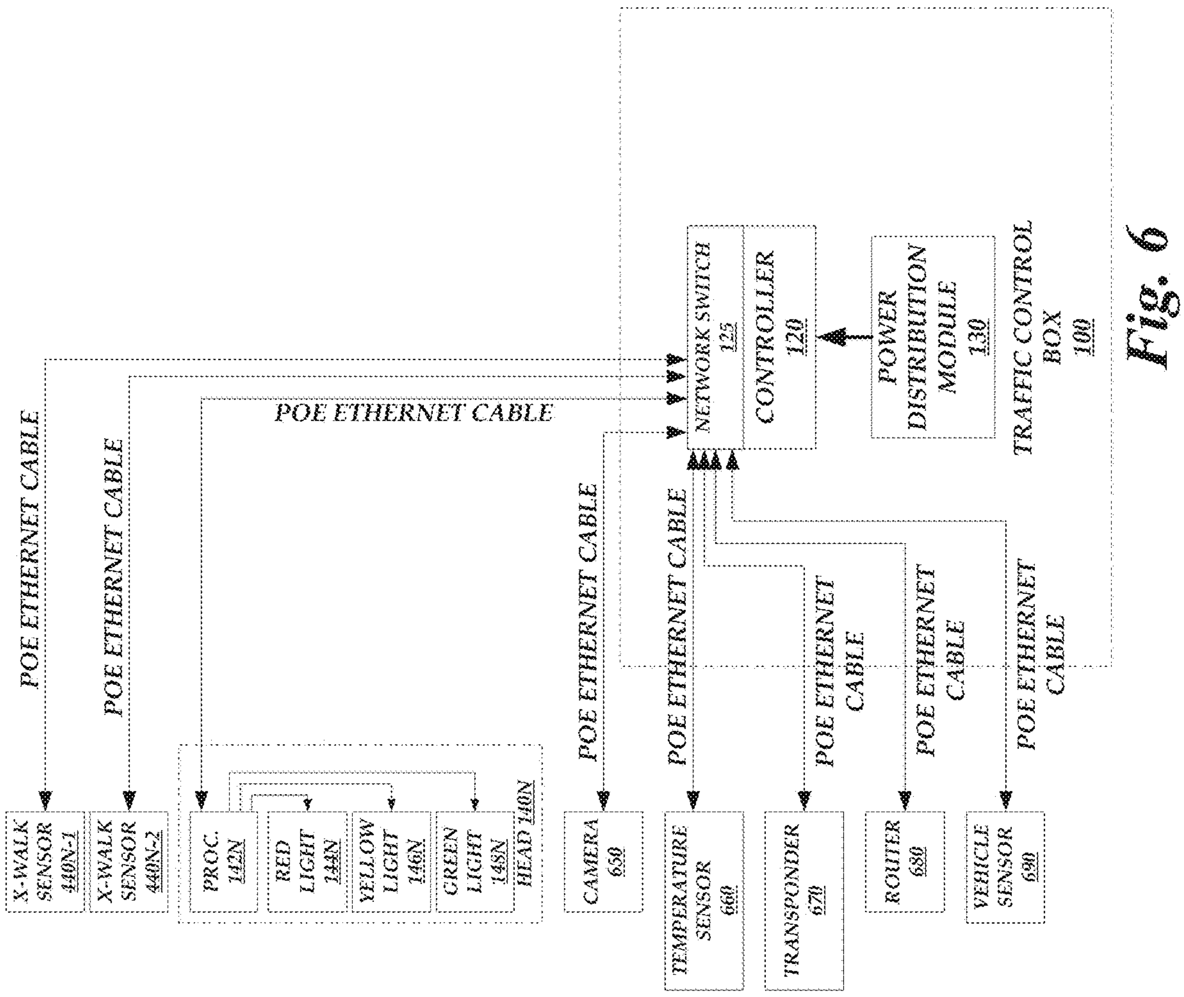
FIG. 6 illustrates an exemplary block diagram depicting a version of the improved vehicle traffic signal control system of FIG. 1A that includes other components in addition to the various crosswalk buttons of FIG. 4A.

In some embodiments, other components in addition to the crosswalk buttons 440 can be included in the improved vehicle traffic signal control system and/or affect the light activation/deactivation determinations made by the processors 142N, 142S, 142W, and/or 142E. FIG. 6 illustrates an exemplary block diagram depicting a version of the improved vehicle traffic signal control system of FIG. 1A that includes other components in addition to the various crosswalk buttons 440. For example, as illustrated in FIG. 6, the improved vehicle traffic signal control system includes one or more of a camera 650, a temperature sensor 660, a transponder 670, a router 680, or a vehicle sensor 690. While FIG. 6 depicts a single camera 650, temperature sensor 660, transponder 670, router 680, and vehicle sensor 690, this is not meant to be limiting. Rather, FIG. 6 depicts example components that optionally may be present at or near an intersection. Any number of these components can be present at or near an intersection. In addition, any number of other similar components, like IoT devices, can also be present at or near the intersection, be powered via the electrical power carried over the Ethernet cables, and/or interact with the traffic control box 100 and/or light heads 140 in a similar manner as described herein.

The camera 650 can be located on a pole supporting a light head and face traffic in the intersection to capture images and/or video. For example, the camera 650 can be located on a pole supporting the light head 140N and face traffic traveling North. The camera 650 can be coupled to the network switch 125 via an Ethernet cable, and thus can be powered using the electrical power carried over the Ethernet cable.

The camera 650 may simply capture images and/or video for transmission via the traffic control box 100 and a network to a remote system (e.g., a traffic monitoring system). The images and/or video captured by the camera 650 can also be used by the light heads 140N, 140S, 140W, and/or 140E in making the light activation/deactivation determinations. For example, the camera 650 can transmit captured images and/or video to one or more of the processors 142N, 142S, 142W, and/or 142E. A processor 142N, 142S, 142W, and/or 142E can process the images and/or frames of the video to, for example, determine whether a vehicle is waiting at the intersection or is about to approach the intersection. As an illustrative example, if the camera 650 is located on the pole supporting the light head 140N and faces traffic traveling North, the red light 144N is on, and the green and yellow lights 148N and 146N are off, the processors 142W and/or 142E (e.g., the processors of the East-West light heads) can process the images and/or the frames of the video to identify whether there are any vehicles traveling North present at the intersection or approaching the intersection. If there are one or more vehicles traveling North present at the intersection or approaching the intersection, the time that the green lights 148W and 148E should be enabled has expired, and/or there are no vehicles traveling East or West present at the intersection or approaching the intersection (e.g., as determined based on processing images and/or video frames captured by another camera facing East and/or West, based on vehicle sensors present at the intersection, etc.), then the processors 142W and/or 142E can turn off the corresponding green lights 148W and 148E, respectively, and turn on the corresponding red lights 144W and 144E, respectively. This would then allow the processor 142N to turn the green light 148N on and allow the vehicle(s) traveling North to pass through the intersection. On the other hand, if there are no vehicles traveling North present at the intersection or approaching the intersection and the time that the green lights 148W and 148E should be enabled has expired, the processors 142W and 142E can keep the green lights 148W and 148 E on even though the green light on time has expired given that there are no vehicles traveling North waiting to pass through the intersection. Thus, the improved vehicle traffic signal control system can more efficiently control the flow of traffic.

The temperature sensor 660 can be located on a pole supporting a light head or on another structure near an intersection. The temperature sensor 660 can be coupled to the network switch 125 via an Ethernet cable, and thus can be powered using the electrical power carried over the Ethernet cable. The temperature sensor 660 can measure temperatures at the intersection, transmitting the measured temperatures to the traffic control box 100 via the Ethernet cable (or via a wireless connection). The traffic control box 100 can then forward the measurements to a remote system via a network such that the measurements can be available, for example, on a content page (e.g., a network page, a web page, etc.). Alternatively or in addition, the temperature sensor 660 can measure temperatures at the intersection, transmitting the measured temperatures to the various processors 142N, 142S, 142W, and/or 142E via the Ethernet cable (or via a wireless connection). The processors 142N, 142S, 142W, and/or 142E can use the measured temperatures to, for example, modify when and for how long lights 144N, 144S, 144W, 144E, 146N, 146S, 146W, 146E, 148N, 148S, 148W, and/or 148E are enabled and/or disabled. As an illustrative example, if the temperature drops below a certain value (e.g., 32° F.), vehicles may have a harder time stopping due to ice, snow, and/or the like. Thus, when the temperature drops below this value and a processor 142N, 142S, 142W, and/or 142E receives a status message indicating that a red light 144N, 144S, 144W, and/or 144E in a first direction (e.g., North) is now enabled, the processor 142N, 142S, 142W, and/or 142E may wait a longer than normal period of time (e.g., 5 seconds instead of 1 second) before enabling a green light 148N, 148S, 148W, and/or 148E in a second direction (e.g., West) to prevent possible accidents resulting from the low temperature. The same techniques can be applied to other sensors that measure weather conditions and that may be present at the intersection and communicate and receive electrical power via an Ethernet cable, such as humidity sensors, wind sensors, rain sensors, etc.

The transponder 670 can be located on a pole supporting a light head or on another structure near an intersection. The transponder 670 can be coupled to the network switch 125 via an Ethernet cable, and thus can be powered using the electrical power carried over the Ethernet cable. The transponder 670 can be used to override one or more light heads 140N, 140S, 140W, and/or 140E, causing one or more light heads 140N, 140S, 140W, and/or 140E to enable and/or disable specific lights 144N, 144S, 144W, 144E, 146N, 146S, 146W, 146E, 148N, 148S, 148W, and/or 148E. For example, the transponder 670 can be used by law enforcement during emergencies to immediately turn green lights on in the direction being traveled by law enforcement and to turn red lights off in the direction(s) not being traveled by law enforcement.

The router 680 can be located on a pole supporting a light head or on another structure near an intersection. The router 680 can be coupled to the network switch 125 via an Ethernet cable, and thus can be powered using the electrical power carried over the Ethernet cable. The router 680 can be used to transmit communications to other intersections, such as information indicating the volume of vehicles that have traveled through the present intersection and that are expected to arrive at a next intersection and/or when the vehicles are expected to arrive at the next intersection. The router 680 can receive the relevant information from the light heads 140N, 140S, 140W, and/or 140E, the controller 120, vehicle sensors (e.g., vehicle sensor 690), etc.

The vehicle sensor 690 can be located at an intersection or a certain distance from an intersection (e.g., 50 feet from the intersection, 100 feet from the intersection, 200 feet from the intersection, etc.). For example, the vehicle sensor 690 can be an inductive coil located in and/or below the street asphalt at the intersection (e.g., adjacent to a crosswalk) or a certain distance from the intersection. If multiple vehicle sensors 690 are present, the vehicle sensors 690 can be located in different lanes of the street at the intersection, spaced apart between the intersection and a certain distance from the intersection (e.g., a vehicle sensor 690 can be placed at the intersection and every 50 feet away from the intersection for a total distance of 400 feet), and/or the like.

The vehicle sensor 690 can be coupled to the network switch 125 via an Ethernet cable, and thus can be powered using the electrical power carried over the Ethernet cable. When a vehicle is detected or a certain type of vehicle is detected (e.g., a car, a van, a truck, a motorcycle, etc.), the vehicle sensor 690 can transmit information corresponding to the detection to one or more of the processors 142N, 142S, 142W, and/or 142E via the network switch 125. One or more of the processors 142N, 142S, 142W, and/or 142E can then use the information in a manner similar to as described above with respect to the camera 650 to more efficiently control the flow of traffic.

In further embodiments, the improved vehicle traffic signal control system includes an independent conflict monitor that may receive electrical power via one or one or more Ethernet cables coupled to the network switch 125. For example, each light head 140N, 140S, 140W, 140E can include one or more current sensors configured to monitor the current passing through one or more of the lights 144N, 144S, 144W, 144E, 146N, 146S, 146W, 146E, 148N, 148S, 148W, and/or 148E. The current sensors can transmit status messages to each other, where the status messages indicate which lights 144N, 144S, 144W, 144E, 146N, 146S, 146W, 146E, 148N, 148S, 148W, and/or 148E have a current greater than zero (e.g., indicating the respective light 144N, 144S, 144W, 144E, 146N, 146S, 146W, 146E, 148N, 148S, 148W, and/or 148E is on). If a current sensor determines that two or more green lights 148N, 148S, 148W, and/or 148E are on that would create a conflict (e.g., green lights perpendicular to each other are both on), then the current sensor can notify one or more of the processors 142N, 142S, 142W, and/or 142E, and the processors 142N, 142S, 142W, and/or 142E may then correct the issue (e.g., turning off a conflicting green light) or cause the red lights 144N, 144S, 144W, and/or 144E to flash.

As another example, one or more cameras powered via one or more Ethernet cables can be positioned to face one or more of the lights 144N, 144S, 144W, 144E, 146N, 146S, 146W, 146E, 148N, 148S, 148W, and/or 148E. For example, the camera(s) can be mounted to poles supporting light head(s) 140N, 140S, 140W, and/or 140E. Images and/or video captured by the camera(s) can be transmitted to one or more processors 142N, 142S, 142W, and/or 142E, and the processors 142N, 142S, 142W, and/or 142E can process the images and/or video frames to determine whether a conflict is present. If a conflict is present, the processors 142N, 142S, 142W, and/or 142E can communicate with each other to correct the issue (e.g., turning off a conflicting green light) or cause the red lights 144N, 144S, 144W, and/or 144E to flash.

In some embodiments, the light heads 140N, 140S, 140W, and/or 140E can collect traffic data independent of the controller 120. For example, the light heads 140N, 140S, 140W, and/or 140E can power cameras used to monitor traffic conditions during different times of the day, week, year, etc. The light heads 140N, 140S, 140W, and/or 140E (e.g., via the processors 142N, 142S, 142W, and/or 142E) can transmit the traffic data directly to an historical traffic data collection system via or not via the controller 120. In typical vehicle traffic signal control systems, any collected traffic data passes through the controller before being forwarded to an historical traffic data collection system. However, transmitting the data via the controller can increase data transmission latency. In addition, the extra step that results from first transmitting the traffic data to the controller provides an additional opportunity for data loss to occur (e.g., via severed wires, power outages, signal interference, etc.). On the other hand, because the light heads 140N, 140S, 140W, and/or 140E have data processing capabilities, the controller 120 can be bypassed when collecting and transmitting such traffic data, thereby reducing data transmission latency and reducing the likelihood that data loss will occur.

Light Control Routine

Figure 7:
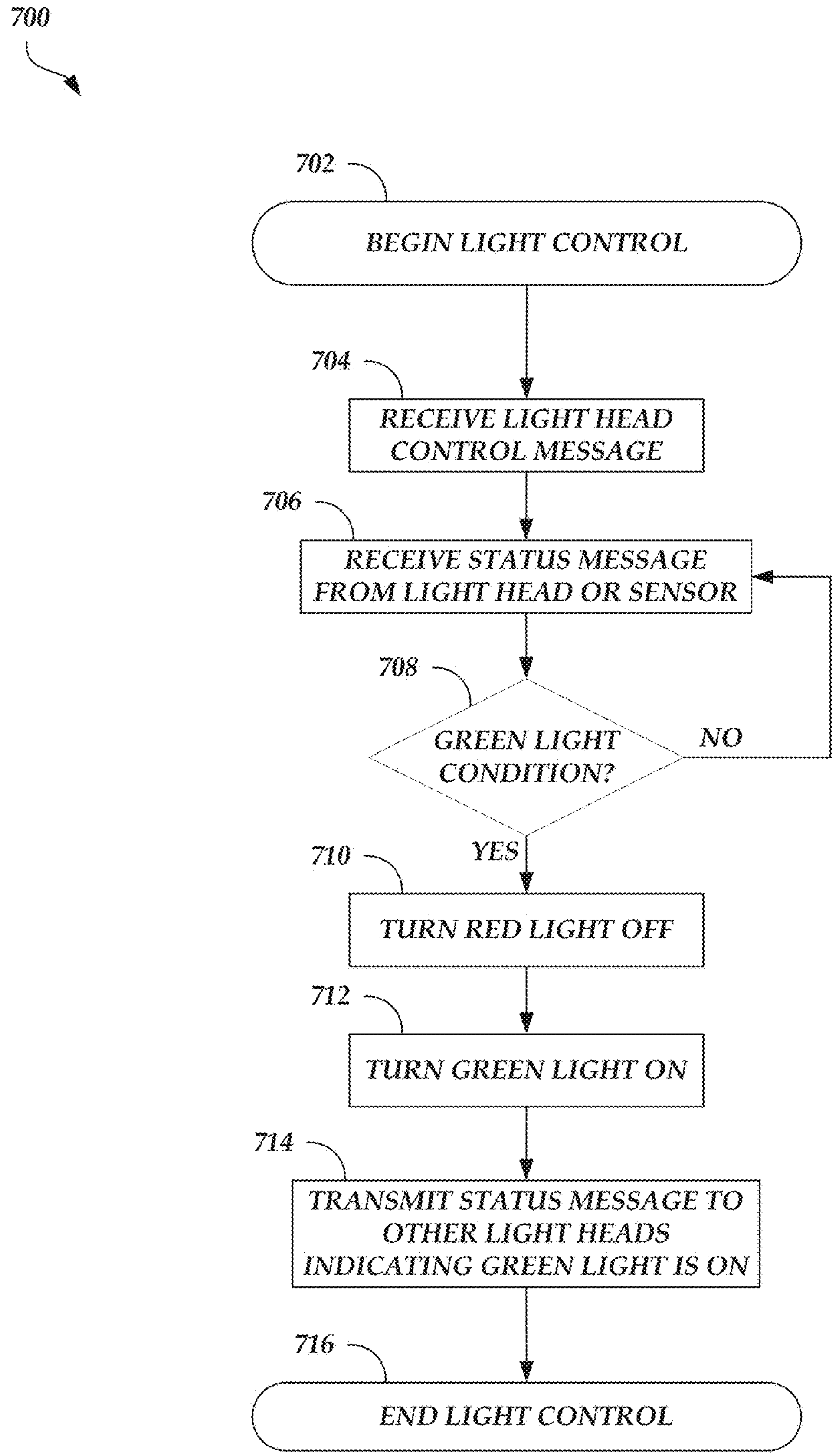
FIG. 7 is a flow diagram depicting a light control routine, according to one embodiment.

FIG. 7 is a flow diagram depicting a light control routine 700, according to one embodiment. As an example, a light head 140N, 140S, 140W, and/or 140E (e.g., a processor 142N, 142S, 142W, and/or 142E) of FIG. 1A can be configured to execute the light control routine 700. The light control routine 700 begins at block 702.

At block 704, a light head control message is received. For example, the light head control message may be received from the controller 120. The light head control message may include rules that define when a light head can enable and/or disable lights.

At block 706, a status message is received from a light head or sensor. For example, the sensor can be a crosswalk button 440, a camera 650, a transponder 660, a vehicle sensor 690, an IoT device, and/or the like. The status message may indicate a change in the state of a light head or the sensor.

At block 708, a determination is made as to whether a green light condition is present. For example, the green and yellow lights of the light head executing the light control routine 700 may be off and the red light of the light head executing the light control routine 700 may be on. A green light condition may be present, as defined by the rules in the light head control message, if certain red lights are on, certain green and yellow lights are off, and/or certain crosswalks are off. The determination can be made using the received status message and any previously received status messages. If the green light condition is present, then the light control routine 700 proceeds to block 710. Otherwise, if the green light condition is not present, then the light control routine 700 proceeds back to block 706.

At block 710, the red light is turned off. In response to turning the red light off or in response to making the determination that the red light should be turned off, the light head can generate and transmit a status message corresponding to the change in state of the red light from on to off.

At block 712, the green light is turned on. For example, the green light can be turned on by allowing electrical power received from the network switch 125 via the Ethernet cable to pass through to the green light.

At block 714, a status message is transmitted to other light heads indicating that the green light is on. The status message can be generated and/or transmitted in response to turning the green light on or in response to making the determination that the green light should be turned on. After transmitting the status message, the light control routine 700 ends, as shown at block 716.

Traffic Signal Retrofit Routine

Figure 8:
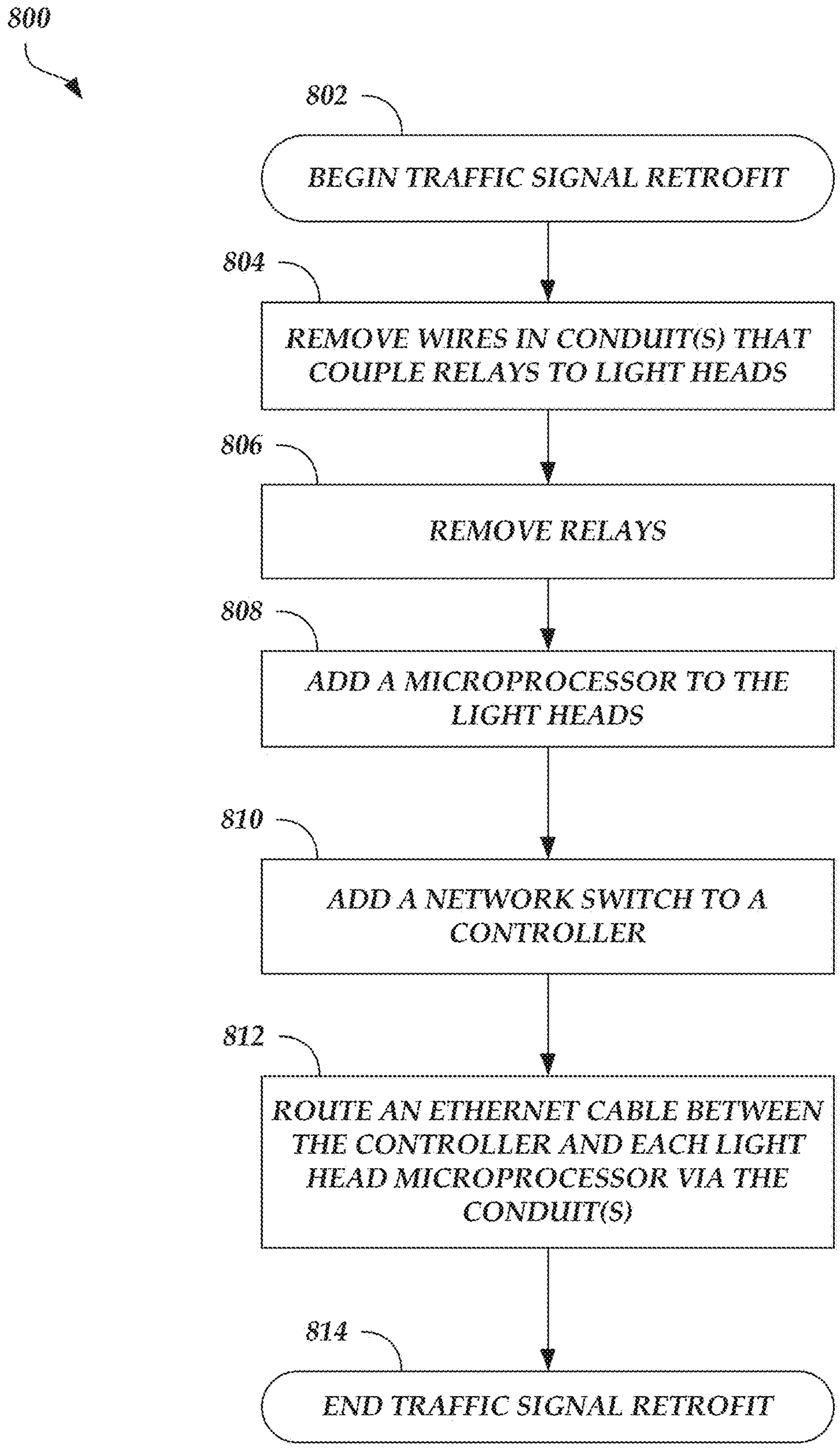
FIG. 8 is a flow diagram depicting a traffic signal retrofit routine, according to one embodiment.

FIG. 8 is a flow diagram depicting a traffic signal retrofit routine, method, or process 800, according to one embodiment. As an example, a technician, contractor, civil engineer, and/or other similar individual can perform the traffic signal retrofit routine 800 to retrofit an existing intersection to implement the features of the improved vehicle traffic signal control system described herein. The traffic signal retrofit routine 800 begins at block At block 804, wires in conduit(s) that couple relays to light heads are removed. For example, these wires can include the wires that carry 120 VAC from relays to each light head light, the neutral wires, and the ground wires. As an illustrative example, if a light head includes five lights, seven wires are removed from the conduit(s): the 120 VAC wire from relay #1 to light #1, the 120 VAC wire from relay #2 to light #2, the 120 VAC wire from relay #3 to light #3, the 120 VAC wire from relay #4 to light #4, the 120 VAC wire from relay #5 to light #5, the neutral wire, and the ground wire. If each light head at the intersection includes five lights and there are four light heads total at the intersection, then 28 total wires are removed from the conduit(s).

At block 806, relays are removed. For example, the relays that are removed may be the relays originally used to control whether electrical power is supplied to the various light head lights. In further embodiments, other components are also removed from the traffic signal box, including a conflict monitor.

At block 808, a processor (e.g., a microprocessor) is added to the light heads at the intersection. For example, each light head may be modified to include one or more processors programmed to execute computer-executable instructions that, when executed by the processor(s), cause the processor(s) to perform the operations described herein, including supplying or not supplying electrical power to the light head lights. The computer-executable instructions can be stored in memory also added to each of the light heads, and may be derived from the rules or instructions included in the light head control message. For example, a light head can store the rules or instructions included in the light head control message in the memory once the light head control message is received. The rules or instructions can be stored in the form of computer-executable instructions. The light head processor can then retrieve some or all of the computer-executable instructions from the memory for execution, causing the processor to perform the operations described herein.

At block 810, a network switch is added to the controller. For example, the network switch can be an Ethernet switch. Alternatively, the original controller in the traffic signal box is replaced with another controller that includes a network switch or that is configured to couple to a network switch.

At block 812, an Ethernet cable is routed between the controller and each light head processor via the conduit(s). Thus, the bulky wires originally present in the conduit(s) can be replaced with one or more Ethernet cables. In particular, the bulky wires associated with a single light head originally present in the conduit(s) to couple relays to the associated light head can be replaced with a single Ethernet cable that couples the controller to the light head. As an illustrative example, if a light head includes five lights, seven wires are removed from the conduit(s) and replaced with a single Ethernet cable. After the Ethernet cable(s) are routed between the controller and light heads, the traffic signal retrofit 802 routine ends, as shown at block 814.

As is apparent, the traffic signal retrofit routine 800 allows technicians, contractors, civil engineers, and/or other similar individuals to reuse existing infrastructure (e.g., conduits, poles, etc.) to implement the improved vehicle traffic signal control system. Because existing infrastructure can be reused, the improved vehicle traffic signal control system can be implemented to include a wide variety of technology (e.g., cameras, light emitting diode (LED) lights, Internet-of-Things (IoT) devices, etc.) at a modest upgrade cost.

Optionally, a retrofit kit may be provided with some or all of the components and/or instructions necessary to perform the traffic signal retrofit routine 800. For example, the retrofit kit may include a processor (e.g., processor 142N, 142S, 142W, and/or 142E) that can be added to a light head (e.g. attached to a light head, installed within a light head, etc.) and be coupled to the various lights in the light head. The retrofit kit can also include an Ethernet cable that can be coupled between the light head and the controller 120. Thus, the retrofitted light head would, in total, receive 120 VAC for each light, neutral, ground, and the Ethernet cable (e.g., the existing wires may not be removed). The processor of the retrofit kit could then be used to control the enabling and/or disabling of the lights in the light head.

While the improved vehicle traffic signal control system is described herein primarily with reference to automobiles or other street-capable vehicles, this is not meant to be limiting. The features described herein can be implemented in any type of vehicle traffic control system, such as an air traffic taxiing control system, a train traffic control system, a ship traffic control system, and/or the like.

Terminology

All of the methods and tasks described herein may be performed and fully automated by a computer system. The computer system may, in some cases, include multiple distinct computers or computing devices (for example, physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (for example, solid state storage devices, disk drives, etc.). The various functions disclosed herein may be embodied in such program instructions, or may be implemented in application-specific circuitry (for example, ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (for example, not all described operations or events are necessary for the practice of the algorithm). Moreover, in certain embodiments, operations or events can be performed concurrently, for example, through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (for example, ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," "for example," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:

a first light; and a processor configured with computer-executable instructions that, when executed, cause the processor to at least:

determine that at least one of a vehicle or a pedestrian is detected at an intersection;

cause the first light to transition to a first state in response to the determination that at least one of the vehicle or pedestrian is detected at the intersection;

generate a status message indicating that the first light is in the first state; and transmit the status message to a second light head.

2. The system of claim 1, wherein the first light is coupled to a light pole, and wherein the computer-executable instructions, when executed, further cause the processor to at least determine that the vehicle is detected at the intersection based on a camera coupled to the light pole.

3. The system of claim 1, wherein the first light is coupled to a light pole, and wherein the computer-executable instructions, when executed, further cause the processor to at least determine that the vehicle is detected at the intersection based on a transponder coupled to the light pole.

4. The system of claim 1, wherein the first light is coupled to a light pole, and wherein the computer-executable instructions, when executed, further cause the processor to at least determine that the pedestrian is detected at the intersection based on a crosswalk button coupled to the light pole.

5. The system of claim 1, wherein the computer-executable instructions, when executed, further cause the processor to at least determine that at least one of the vehicle or the pedestrian is detected at the intersection based on a sensor located at the intersection.

6. The system of claim 5, wherein the sensor comprises one of an inductive coil, a light detection and ranging sensor, a radio detection and ranging sensor, an infrared sensor, a motion detector, or a presence detector.

7. The system of claim 6, wherein the computer-executable instructions, when executed, further cause the processor to at least transmit, to the second light head, an object detection message that comprises an indication that the sensor detected an object in the intersection.

8. The system of claim 7, wherein transmission of the object detection message to the second light head causes the second light head to wait to transition the second light to the first state until at least a second object detection message is received that comprises an indication that the sensor does not detect the object in the intersection.

9. The system of claim 1, wherein the status message is transmitted via one of a wired connection or a wireless connection.

10. A computer-implemented method comprising:

as implemented by a light head having one or more processors and a first light, determining that at least one of a vehicle or a pedestrian is detected at an intersection;

causing the first light to transition to a first state in response to the determination that at least one of the vehicle or pedestrian is detected at the intersection;

generating a status message indicating that the first light is in the first state; and transmitting the status message to a second light head.

11. The computer-implemented method of claim 10, wherein the first light is coupled to a light pole, and wherein determining that at least one of a vehicle or a pedestrian is detected at an intersection further comprises determining that the vehicle is detected at the intersection based on a camera coupled to the light pole.

12. The computer-implemented method of claim 10, wherein the first light is coupled to a light pole, and wherein determining that at least one of a vehicle or a pedestrian is detected at an intersection further comprises determining that the vehicle is detected at the intersection based on a transponder coupled to the light pole.

13. The computer-implemented method of claim 10, wherein the first light is coupled to a light pole, and wherein determining that at least one of a vehicle or a pedestrian is detected at an intersection further comprises determining that the pedestrian is detected at the intersection based on a crosswalk button coupled to the light pole.

14. The computer-implemented method of claim 10, wherein determining that at least one of a vehicle or a pedestrian is detected at an intersection further comprises determining that at least one of the vehicle or the pedestrian is detected at the intersection based on a sensor located at the intersection.

15. The computer-implemented method of claim 14, wherein the sensor comprises one of an inductive coil, a light detection and ranging sensor, a radio detection and ranging sensor, an infrared sensor, a motion detector, or a presence detector.

16. The computer-implemented method of claim 15, further comprising transmitting, to the second light head, an object detection message that comprises an indication that the sensor detected an object in the intersection.

17. The computer-implemented method of claim 16, wherein transmission of the object detection message to the second light head causes the second light head to wait to transition the second light to the first state until at least a second object detection message is received that comprises an indication that the sensor does not detect the object in the intersection.

18. Non-transitory, computer-readable storage media comprising computer-executable instructions, wherein a light head comprises a processor and a first light, and wherein the computer-executable instructions, when executed by the processor, cause the processor to perform operations comprising:

determining that at least one of a vehicle or a pedestrian is detected at an intersection;

causing the first light to transition to a first state in response to the determination that at least one of the vehicle or pedestrian is detected at the intersection;

generating a status message indicating that the first light is in the first state; and transmitting the status message to a second light head.

19. The non-transitory, computer-readable storage media of claim 18, wherein the computer-executable instructions cause the processor to perform operations further comprising determining that at least one of the vehicle or the pedestrian is detected at the intersection based on a sensor located at the intersection.

20. The non-transitory, computer-readable storage media of claim 19, wherein the sensor comprises one of an inductive coil, a light detection and ranging sensor, a radio detection and ranging sensor, an infrared sensor, a motion detector, or a presence detector.

* * * * *